US011526498B2

(12) United States Patent
Chernov et al.

(10) Patent No.: US 11,526,498 B2
(45) Date of Patent: Dec. 13, 2022

(54) STORAGE OF SHARD DATA

(71) Applicant: GM Cruise Holdings LLC, San Francisco, CA (US)

(72) Inventors: Mikhail Chernov, Foster City, CA (US); Xiaojun Sun, San Jose, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/219,597

(22) Filed: Mar. 31, 2021

(65) Prior Publication Data

US 2022/0318228 A1    Oct. 6, 2022

(51) Int. Cl.
| | |
|---|---|
| *G06F 16/00* | (2019.01) |
| *G06F 16/23* | (2019.01) |
| *G06F 16/29* | (2019.01) |
| *G05D 1/02* | (2020.01) |

(52) U.S. Cl.
CPC .......... *G06F 16/2379* (2019.01); *G06F 16/29* (2019.01); *G05D 1/021* (2013.01)

(58) Field of Classification Search
CPC ...... G06F 16/2282; G06F 16/25; G06F 16/29; G06F 16/951; G06F 16/2379; G05D 1/021
See application file for complete search history.

(56) References Cited

U.S. PATENT DOCUMENTS

| | | | |
|---|---|---|---|
| 10,955,855 B1 * | 3/2021 | Tran | G05D 1/0246 |
| 2008/0243908 A1 * | 10/2008 | Aasman | G06F 16/28 |
| | | | 707/999.102 |
| 2015/0347481 A1 | 12/2015 | Chen et al. | |
| 2017/0097942 A1 * | 4/2017 | Couckuyt | G06F 16/2282 |
| 2017/0249401 A1 * | 8/2017 | Eckart | G06V 10/955 |
| 2020/0372163 A1 * | 11/2020 | Chung | G06F 16/1824 |

FOREIGN PATENT DOCUMENTS

EP          1503347 A2    2/2005

OTHER PUBLICATIONS

PCT International Search Report and Written Opinion dated Jan. 20, 2022 in PCT/US2021/048533; 10 pages.

* cited by examiner

*Primary Examiner* — Dinku W Gebresenbet
(74) *Attorney, Agent, or Firm* — Akona IP PC

(57) ABSTRACT

A method for storing shard data and data formats for storing shard data are proposed. Shard data entries are generated and stored, wherein each shard data entry comprises a definition of one or more semantic objects covered by the shard data entry. Shard metadata is generated and stored, wherein the metadata comprises references to the shard data entries and, for each of the shard data entries, data representative of a bounding box indicative of an area in a geographical area that is covered by the shard data entry.

20 Claims, 16 Drawing Sheets

STORAGE OF SHARD DATA

TECHNICAL FIELD OF THE DISCLOSURE

The present disclosure relates generally to autonomous vehicles. More specifically, the present disclosure relates to methods for storing shard data for autonomous vehicles.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. Autonomous technology typically makes use of map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
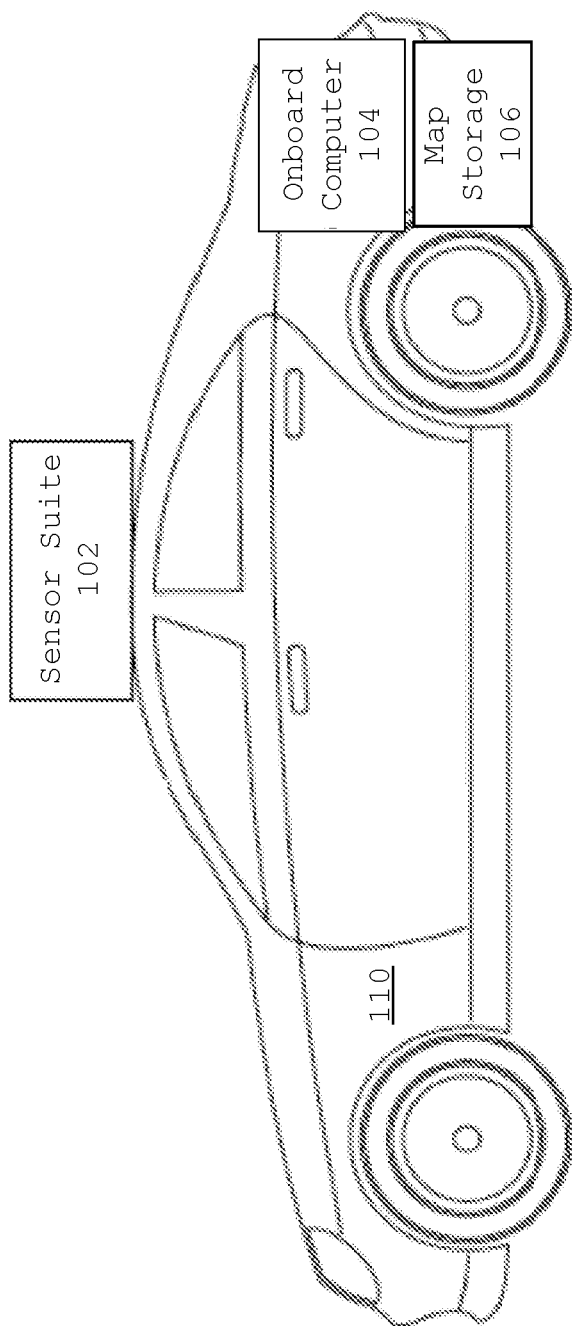
FIG. 1 is a diagram illustrating an autonomous vehicle, according to some embodiments of the disclosure.

The systems, methods and devices of this disclosure each have several innovative aspects, no single one of which is solely responsible for all of the desirable attributes disclosed herein. Details of one or more implementations of the subject matter described herein are set forth below and the accompanying drawings.

It will be recognized that maps are a key component in autonomous vehicle technology. In particular, the highly specialized needs of autonomous vehicles require highly specialized, and high definition, maps that represent the world at a level of resolution one to two orders of magnitude greater than offered by regular web map services that are widely used for turn-by-turn navigation. Such high resolution is necessary because autonomous vehicles are routinely required to execute complex maneuvers, such as safely navigating and accommodating bike lanes and pedestrian paths along roadways, for example.

An autonomous vehicle mapping system, or database, may include several layers, or types, of maps or mapping information. For example, a mapping database may include a standard mapping layer, a geometric mapping layer, a semantic mapping layer, a map priors layer, and/or a real-time information layer. The standard mapping layer includes mapping information at a level similar/identical to that available from the aforementioned web mapping services. The geometric mapping layer includes three-dimensional (3D) mapping information for defining a drivable portion of a mapped area. The semantic mapping layer builds on the geometric mapping information by adding semantic objects, including two-dimensional (2D) and 3D traffic objects (such as parking spots, lane boundaries, intersections, crosswalks, stop signs, traffic lights) for facilitating driving safety. Semantic objects may include associated metadata, such as speed limits and turn restrictions for lanes, for example. The map priors layer includes derived information about dynamic elements as well as human driving behavior. The optional real-time information layer is typically read/write enabled and is a portion of the mapping database designed to be updated while the autonomous vehicle is providing an autonomous vehicle service and (as its name implies) contains real-time data, such as traffic congestion, newly discovered construction zones, observed speeds, etc. The real-time information is designed to support gathering and sharing of real-time global information among a fleet of autonomous vehicles.

From the information in the autonomous vehicle mapping system, map data may be generated that combines one or more of the layers into a semantic map. The present disclosure relates to the generation and use of map data.

Map data typically includes data required by an autonomous vehicle to make driving decisions and is traditionally generated as a data file or data container that includes a semantic map of a geographical area. Such data file or data container may be referred to as monolithic map data.

The geographical area traditionally covered by monolithic map data is, e.g., a city or a country. Map data may be generated at a central computer system, from where it may be uploaded or otherwise installed onto a data storage of the autonomous vehicles, typically located in the autonomous vehicle.

Additionally, or alternatively, map data may be used for software development, where, e.g., autonomous vehicles or parts thereof may be simulated to develop new features or improve existing features of the autonomous vehicles. The simulation environment can make use of map data similar to an autonomous vehicle using such map data. To allow teams of developers to work on the software developments, the simulation environment may be distributed to the different teams, who may work on different aspects of the software. The map data is typically copied to each of the teams to allow dedicated access to the map data to the development teams.

Depending on the size of the geographical area covered by the monolithic map data, the data file or data container can be very large. For a larger city, a data file can be hundreds of megabytes or even gigabytes in size. To cover a country, a monolithic map data file can be gigabytes in size for a smaller country or terabytes in size for a larger country. Uploading monolithic map data of these sizes to autonomous vehicles and/or software development teams requires large network capacity and large data plans. Furthermore, when processing or using the monolithic map data at the autonomous vehicle or simulation environment, processing requirements (e.g., CPU requirements) and/or working memory requirement (e.g., RAM capacity) may be high, especially when the semantic map is loaded and unpacked into memory in full from the monolithic map data.

The present disclosure aims to lower or minimize the size of the map data, thereby lowering network capacity, processing and/or memory requirements. In this disclosure, autonomous vehicles and simulation devices are also referred to as "clients", as in client devices to the autonomous vehicle mapping system.

According to some embodiments of the present disclosure, semantic map sharding reduces or minimizes the size of the map data loaded and/or processed by a client. With semantic map sharding, a segmentation algorithm generates semantic map shards (also referred to as "shards" or "shard data"), which may be used as an alternative to monolithic map data.

In some embodiments, shards may be provided by the mapping system as well as monolithic map data, e.g., in case different geographical areas (e.g., different cities or different countries) are covered by either monolithic map data or shards-based data, or, e.g., for backward compatibility where some autonomous vehicles support monolithic map data and other autonomous vehicles support shard data.

The concept of semantic map sharding introduces various changes to the systems, methods and data formats used in traditional monolithic map data generation and usage.

According to some aspects of the present disclosure, systems and methods are proposed for generating shard data based on semantic map sharding. Shard data may be generated by a map sharder that is configured to generate the shard data based on semantic objects in a geographical area and a definition of sections. The sections may cover parts of the geographical area. The map sharder may search, for each of the sections, for semantic objects that are located at least partly in a section and stores found objects in a shard data entry of the shard data.

According to some aspects of the present disclosure, systems and methods are presented to generate shard data from a geographical area that has been split into sections. The system and method may use data representative of a geographical area that is split into sections and data representative of semantic objects located in the geographical area. For each of the sections, semantic objects may be searched that are located at least partly in a section. A shard data entry of the shard data may be generated. The shard data entry may include one or more semantic objects found by the searching.

According to some aspects of the present disclosure, a rules based semantic map sharding is proposed. A method of handling semantic objects for semantic map sharding may make used of rules to define which semantic objects are to be included in a shard. Hereto, semantic objects may be defined in a geographical area to be contained in shard data. For the semantic objects, a set of rules may be defined including a definition of which semantic objects are to be combined into a shard data entry of the shard data and which semantic objects are to be stored in separate shard data entries.

According to some aspects of the present disclosure, a method for storing shard data and data formats for storing shard data are proposed. Shard data entries may be generated and stored, wherein each shard data entry may include a definition of one or more semantic objects covered by the shard data entry. Shard metadata may be generated and stored, wherein the metadata may include references to the shard data entries and, for each of the shard data entries, data representative of a bounding box indicative of an area in a geographical area that is covered by the shard data entry.

Semantic Map Shards

With semantic map sharding, a semantic map, i.e., a map that combines one or more layers (e.g., standard mapping layer, geometric mapping layer, semantic mapping layer, maps priors layer, and/or real-time information layer) is split into logical chunks called shards. The shards together may be referred to as shard data or the plural form "shards". A single shard may be referred to as a shard data entry or the singular form "shard". Shards are different from tiles, which typically split a raster map into equally sized tiles. Due to the fact that a semantic map is not a raster, but rather a vector/object representation of the world, the semantic map cannot be not suitably split into equally sized tiles.

A semantic map shard is a data object that contains semantic objects and/or links between semantic objects in a specific area. A bounding box indicative of the area covered by a shard may be calculated based on the objects in that shard and stored with the shard. The bounding boxes of shards may be used to determine which shards cover a specific location. The bounding box includes, e.g., data indicative of four corners of an area covered by the shard. A bounding box is not limited to having four corners. More generally, a bounding box may have any polygonal shape with three or more vertices, in which case the bounding box includes, e.g., data indicative of each of the vertices of the polygonal shaped area covered by the shard.

As different objects typically cover different areas, the bounding box will typically be different for different shards. For example, car lanes from a first intersection to a second intersection may be stored in a first shard. Car lanes from a third intersection to a fourth intersection may be stored in a second shard. As the length of the roads in the first and second shards may be different in length and/or differently shaped, the bounding boxes of the first and second shards are likely to be different in size. In another example, a rail line may be located next to the car lanes of the first shard. The rail line may be stored in a third shard, which covers all rail lines in a city and therefore has a larger bounding box.

Shards can include any set of semantic objects. Preferably, a semantic object is contained in one shard only to avoid data integrity or processing problems, e.g., to avoid that a single semantic object is loaded multiple times from multiple shards but interpreted as different objects. A shard need not include all objects in a specific area. Instead, one type of objects or closely related objects may be stored in the same shard and other objects in the same area may be stored in another shard.

Example Autonomous Vehicle Configured for Using Semantic Map Shards

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, RADAR, SONAR, LIDAR, GPS, inertial measurement units (IMUS), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

According to some embodiments of the present disclosure, semantic map sharding may be used to reduce or minimize the size of the map data downloaded or stored in the autonomous vehicle 110, e.g., in map storage 106. The smaller data size of shard data compared to monolithic map data may reduce network capacity requirements for downloading the map data to the autonomous vehicle 110. Additionally, or alternatively, shard data may reduce processor load and/or memory usage of the onboard computer 104 when processing map data stored in map storage 106 of the autonomous vehicle 110. With semantic map sharding, shard data may be downloaded or otherwise installed in the autonomous vehicle 110. Shards may be used by the autonomous vehicle 110 as an alternative to monolithic map data or may be used next to monolithic map data, e.g., in case different areas are covered by either monolithic map data or by shard data.

Example of Autonomous Vehicle Fleet Using Semantic Map Shards

Figure 2:
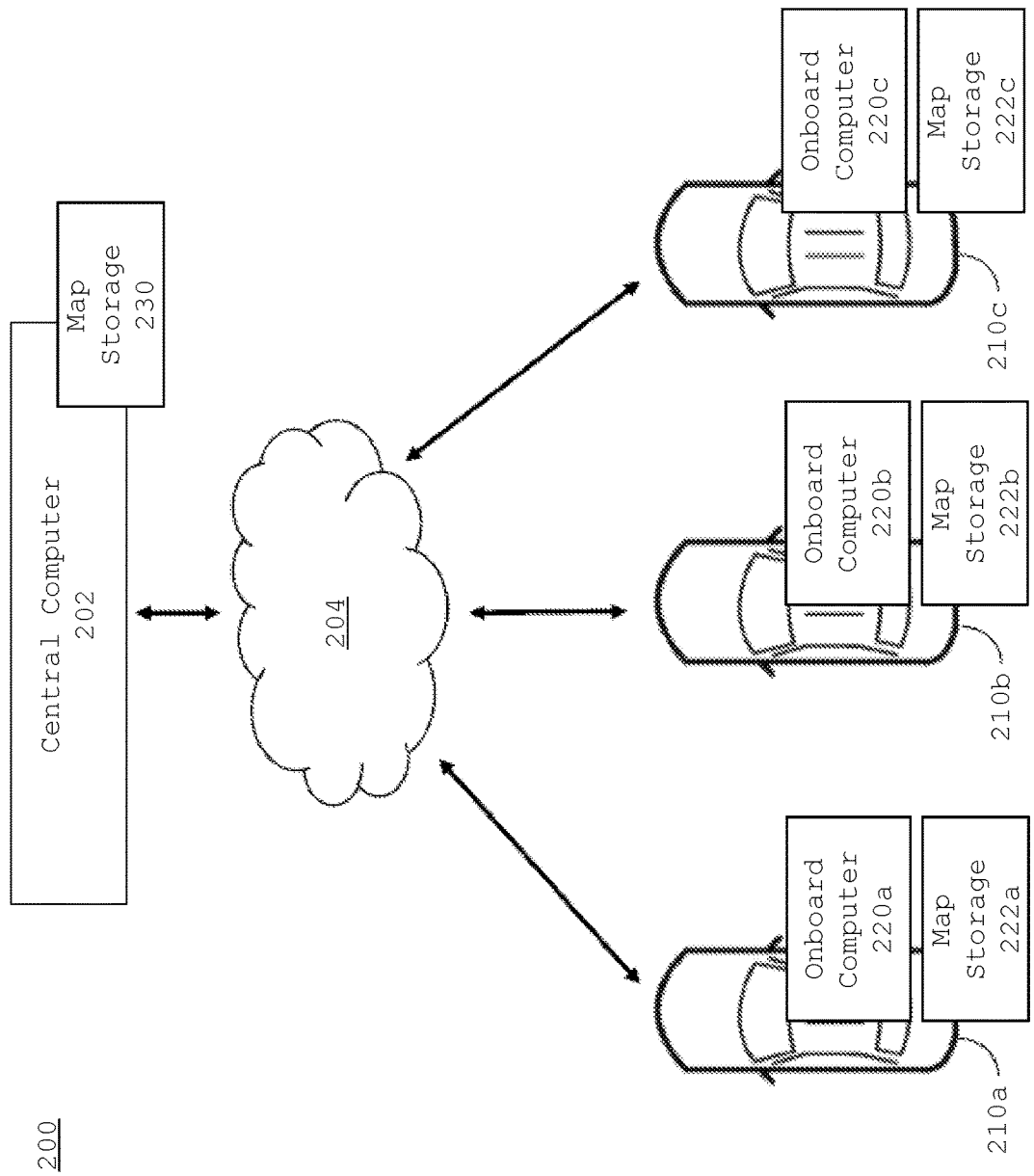
FIG. 2 is a diagram illustrating a fleet of autonomous vehicles in communication with a central computer, according to some embodiments of the disclosure.

FIG. 2 is a diagram 200 illustrating a fleet of autonomous vehicles 210a, 210b, 210c in communication with a central computer 202, according to some embodiments of the disclosure. As shown in FIG. 2, the vehicles 210a-210c communicate wirelessly with a cloud 204 and a central computer 202. The central computer 202 may include a routing coordinator and a database of information from the vehicles 210a-210c in the fleet. Each vehicle 210a-210c can include respective onboard computer 220a-220c and map storage 222a-222c, which can be similar to the onboard computer 104 and map storage 106 of FIG. 1. Specifically, semantic map sharding may be used to reduce or minimize the size of the map data downloaded or stored in the vehicles 210a-210c, e.g., in map storage 222a-222c. Moreover, semantic map sharding may reduce processor load and/or memory usage of the onboard computer 220a-220c when processing the map data.

Autonomous vehicle fleet routing refers to the routing of multiple vehicles in a fleet. In some implementations, autonomous vehicles communicate directly with each other.

When a ride request is received from a passenger, the routing coordinator may select an autonomous vehicle 210a-210c to fulfill the ride request, and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

According to some embodiments of the present disclosure, semantic map sharding may be used to reduce or minimize the size of the map data stored in map storage 230. The smaller data size of shard data compared to monolithic map data may reduce network capacity requirements for downloading the map data from the map storage 230. Alternatively, or additionally, shard data may reduce processor load and memory usage of the central computer 202 when processing map data stored in map storage 230. Shards may be stored in map storage 230 as an alternative to monolithic map data or may be used next to monolithic map data, e.g., in case different areas are covered by either monolithic map data or by shard data.

Example Development Environment Configured for Using Semantic Map Shards

Various development platforms and software work flows exist for developing software. A software workflow that is particularly suitable for the development of software for autonomous vehicles is a continuous integration (CI) workflow. CI is the practice of merging software code changes in small code changes frequently, rather than merging in a large change at the end of a development cycle. An example of a CI development environment is the Travis™ CI, which offers a CI service to build and test software projects hosted on e.g., GitHub™ or Bitbucket™.

Figure 3:
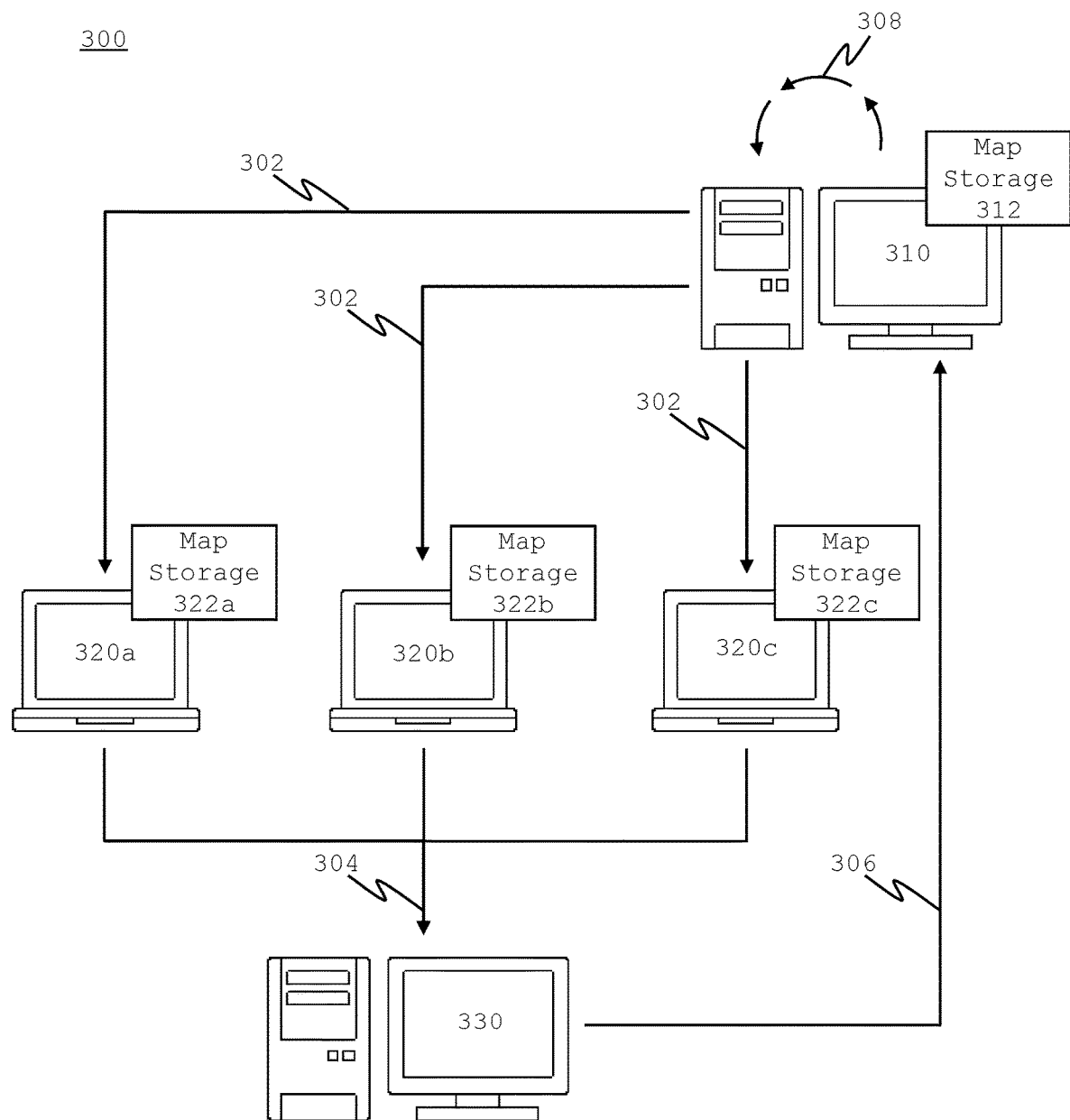
FIG. 3 is a diagram illustrating a software development environment, according to some embodiments of the disclosure.

FIG. 3 is a diagram 300 illustrating a CI software development environment, according to some embodiments of the disclosure. In the example of FIG. 3, software code development is divided over three teams, which may be located at different locations. Each team may use a computer environment 320a-320c for coding and testing portions of software for autonomous vehicles. To allow the computer environments 320a-320c to test software changes, access to the map data may be required. Hereto, each computer environment 320a-320c can include respective map storage 322a-322c for storing map data for use by the computer environments 320a-320c. Specifically, semantic map sharding may be used to reduce or minimize the size of the map data downloaded or stored in the computer environments 320a-320c, e.g., in map storage 322a-322c. Moreover, semantic map sharding may reduce processor load and/or memory usage of the computer environments 320a-320c when processing the map data.

Software code changes may be committed (depicted by arrows 304) from the computer environments 320a-320c to a source control server 330, which collects the software code changes and periodically, e.g., once a day, uploads (depicted by arrow 306) the changed software code to a CI server 310. Alternatively, the CI server 310 may fetch the software code changes from the source control server 330 periodically.

The modified software code, including software code changes from computer environments 320a, 320b and/or 320c, may be built and tested at the CI server 310. The CI server 310 may operate as a simulation environment mimicking an autonomous vehicle to test the software code changes. Test results, such as failure indications or performance metrics, may be logged by the CI server 310. The process of building, testing and logging test results are depicted by the arrows 308 in FIG. 3. To allow the CI server 310 to test the software code, access to the map data may be required. Hereto, the CI server 310 can include a map storage 312 for storing the map data for the CI server 310. Specifically, semantic map sharding may be used to reduce or minimize the size of the map data downloaded or stored in the CI server 310, e.g., in map storage 312. Moreover, semantic map sharding may reduce processor load and/or memory usage of the CI server 310 when processing the map data.

The test results, or parts thereof, may be reported (depicted by arrows 302) from the CI server 310 to the computer environments 320a-320c to allow further code improvements to be made by the respective development teams.

The map storage 322a-322c and/or 312 may be a local storage at the each of the computer environments 320a-320c or CI server 310. Alternatively, the map storage 322a-322c may be a cloud storage for use by the computer environment 320a-320c and/or CI server 310. A cloud storage may be dedicated to one of the computer environments 320a-320c and/or CI server 310, or shared by two or more of the computer environments 320a-320c and/or CI server 310.

Not depicted in FIG. 3, the process of software developing may make use of test data originating from autonomous vehicles driving around in a geographical area, e.g., in a city. This test data, or parts thereof, may be provided to one or more of the computer environments 320a-320c and/or the CI server 310, e.g., to test existing features of the autonomous vehicle against the test data or develop new features.

According to some embodiments of the present disclosure, semantic map sharding may be used to reduce or minimize the size of the map data downloaded or stored in a computer environment and/or a CI server, e.g., in map storage 322a-322c of computer environments 320a-320c and/or map storage 312 of CI server 310. The smaller data size of shard data compared to monolithic map data may reduce network capacity requirements for downloading the map data to the computer environments 320a-320c and to CI server 310. Additionally, or alternatively, shard data may reduce processor load and/or memory usage of the computer environments 320a-320c and the CI server 310 when processing map data.

Example of a System Architecture for Generating Semantic Map Shards

Semantic map shards, such as the shards stored in map storage 106, 220a-220c, 230, 312 or 322a-322c are generated according to a novel process. An example of a system architecture for generating semantic map shards based on this novel process is shown in FIG. 4.

Figure 4:
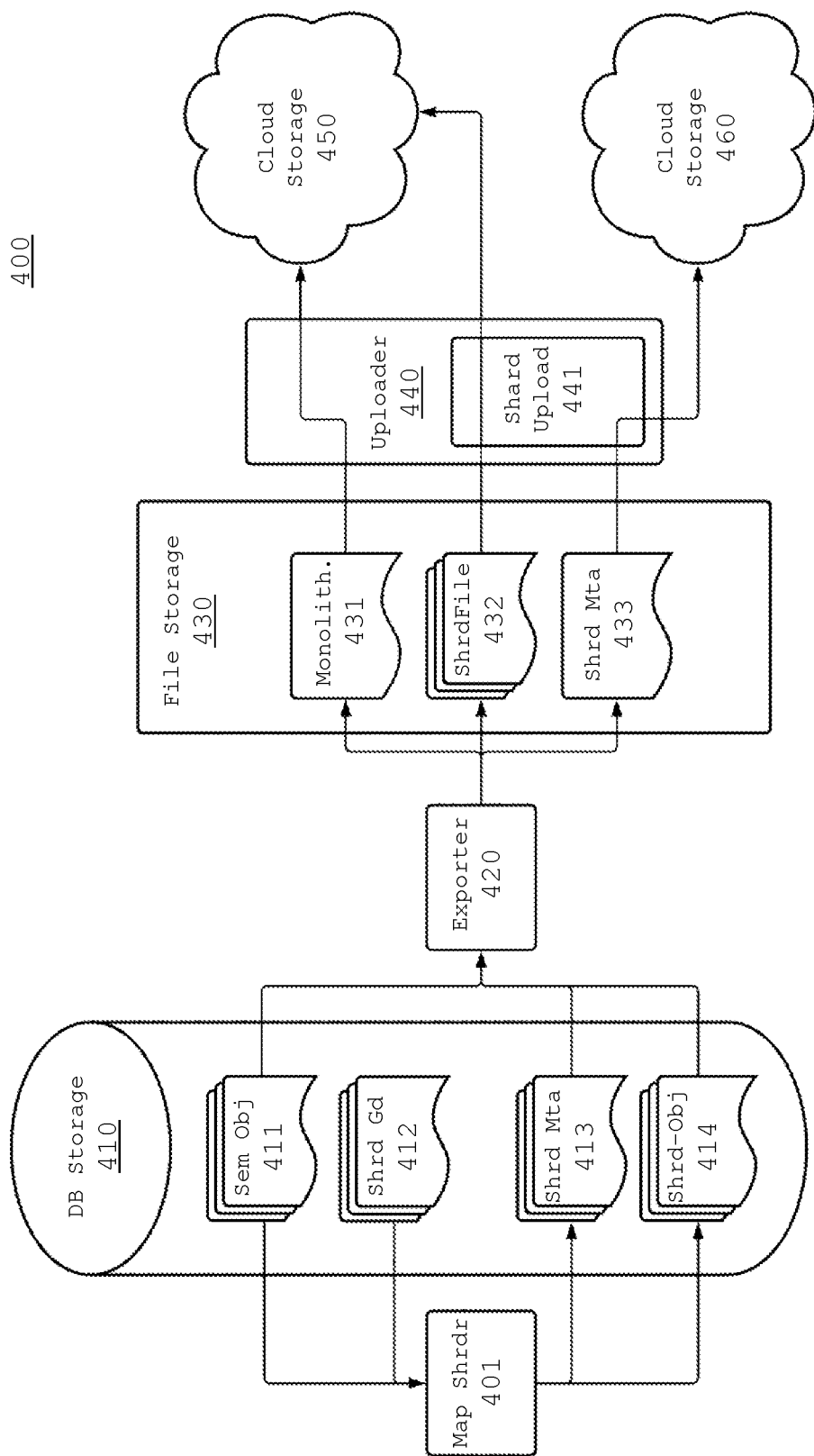
FIG. 4 is a diagram illustrating a system architecture for generating map data in the form of shard data, according to some embodiments of the disclosure.

FIG. 4 shows a system architecture 400 for generating semantic map shards, according to some embodiments of the disclosure. The system architecture 400 may be a part of central computer 202, part of cloud 204, and/or implemented separate from central computer 202 and cloud 204. It is possible that parts of the system architecture 400 are implemented in different computers and/or cloud computing environments.

The system architecture 400 may include a database storage 410 (depicted 'DB Storage 410' in FIG. 4), or any other suitable data storage, from which data may be read and to which data may be written by a map sharder 401 (depicted 'Map Shrdr 401' in FIG. 4). The map sharder 401 may be implemented as a computer system, wherein a processor is configured to execute computer code to perform a map sharder function. The database storage 410 and map sharder 401 may be a part of the same computer system. Alternatively, the database storage 410 may be implemented as a separate database storage that is communicatively connected to the map sharder 401, e.g., via a local area network. It will be understood that any other computer configuration may be used for the database storage 410 and map sharder 401, including but not limited to database storage 410 being accessible by the map sharder 401 via a wide area network or involving cloud computing services.

The database storage 410 may store data that can be input to the map sharder 401 to enable the generation of semantic map shards by the map sharder 401. For example, semantic objects may be stored in any suitable database format in a semantic objects database 411 (depicted 'Sem Obj 411' in FIG. 4). The semantic objects typically include objects present in the semantic mapping layer, such as two-dimensional (2D) and 3D traffic objects (such as parking spots, lane boundaries, intersections, crosswalks, stop signs, traffic lights) for facilitating driving safety. Metadata associated with the semantic objects may be included in the semantic objects database 411, such as speed limits and turn restrictions for lanes.

The database storage 410 may further store shard guiding sections in any suitable database format in a shard guiding sections database 412 (depicted 'Shrd Gd 412' in FIG. 4). Shard guiding sections define different parts of a geographical area and may be used by the map sharder 401 as a guide to find semantic objects in the semantic objects database 411 that are covered by a shard guiding section.

The map sharder 401 may generate semantic map shards based on the input data, the input data typically including semantic objects from a semantic objects database 411 and guiding sections from a shard guiding sections database 412. The generated semantic map shards may be stored in the database storage 410 in any suitable database format. In the example of FIG. 4, the semantic map shards are stored in two databases. A shard metadata database 413 (depicted 'Shrd Mta 413' in FIG. 4) may store metadata related to shards. A shard-to-object relations database 414 (depicted 'Shrd-Obj 414' in FIG. 4) may store shard to object relations data, thereby defining which semantic objects are part of a shard.

It will be understood that the data stored in the database storage 410 may be stored in various manners. For example, one or more of the databases 411-414 may be implemented as separate databases or may be implemented as a single database using different tables. Any other suitable storage method may be used to store the databases 411-414 in the database storage 410.

The system architecture 400 may further include a database exporter 420 (depicted 'Exporter 420' in FIG. 4). The database exporter 420 may be implemented as a computer system, wherein a processor is configured to execute computer code to perform an export function. The database storage 410 and database exporter 420 may be a part of the same computer system. Alternatively, the database storage 410 may be implemented as a separate database storage that is communicatively connected to the database exporter 420, e.g., via a local area network. It will be understood that any other computer configuration may be used for the database storage 410 and database exporter 420, including but not limited to database storage 410 being accessible by the database exporter 420 via a wide area network or involving cloud computing services.

The database exporter 420 may be configured to export shard data from the database storage 410 to a file storage system 430 (depicted 'File Storage 430' in FIG. 4). Hereto, the database exporter 420 may read shard metadata from the shard metadata database 413 and shard objects information from the shard-to-object relations database 414. The exported shard data may be stored in shard files 432 (depicted 'ShrdFile 432' in FIG. 4) and shard metadata 433 (depicted 'Shrd Mta 433' in FIG. 4). The shard files 432 are preferably stored such that one file includes data for one shard. The shard metadata 433 may be stored in a single file. The file storage system 430 enables efficient distribution of the shards to clients.

The database exporter 420 may be configured to generate monolithic map data 431 next to the shard files 432. The monolithic map data 431 (depicted 'Monolith. 431' in FIG. 4) may also be stored in the file storage system 430.

The system architecture 400 may further include an uploader 440 (depicted 'Uploader 440' in FIG. 4). The uploader 440 may be implemented as a computer system, wherein a processor is configured to execute computer code to perform a shard upload function. The file storage system 430 and uploader 440 may be a part of the same computer system. Alternatively, the file storage system 430 may be implemented as a separate file storage that is communicatively connected to the uploader 440, e.g., via a local area network. It will be understood that any other computer configuration may be used for the file storage system 430 and uploader 440, including but not limited to the file storage system 430 being accessible by the uploader 440 via a wide area network or involving cloud computing services.

The uploader 440 may include a shard uploader 441 (depicted 'Shard Upload 441' in FIG. 4) configured to upload shard files 432 to clients. For example, shard uploader 441 may be configured to upload shard files 432 to a cloud storage 450 (depicted 'Cloud Storage 450' in FIG. 4). Computer environments, such as computer environment 320a-320c, CI servers, such as CI server 310, and/or autonomous vehicles, such as autonomous vehicle 110, may access or download the shards from the cloud storage 450. In another example, shard uploader 441 may be configured to upload shard files 432 to a computer environment, e.g., map storage 322a-322c of computer environment 322a-322c, to a CI server, e.g., map storage 312 of CI server 310, and/or to an autonomous vehicle, e.g., map storage 106 of autonomous vehicle 110.

Shard metadata 433 may be uploaded to clients. The shard metadata 433 may be uploaded by the uploader 440 to cloud storage 450 or to another cloud storage 460 (depicted 'Cloud Storage 460' in FIG. 4) for separate storage.

In some embodiments, the uploader 440 may be further configured to upload monolithic map data to a client, e.g., in case the client is not compatible with shard data or in case shard data is not available in a geographical area.

Figure 5:
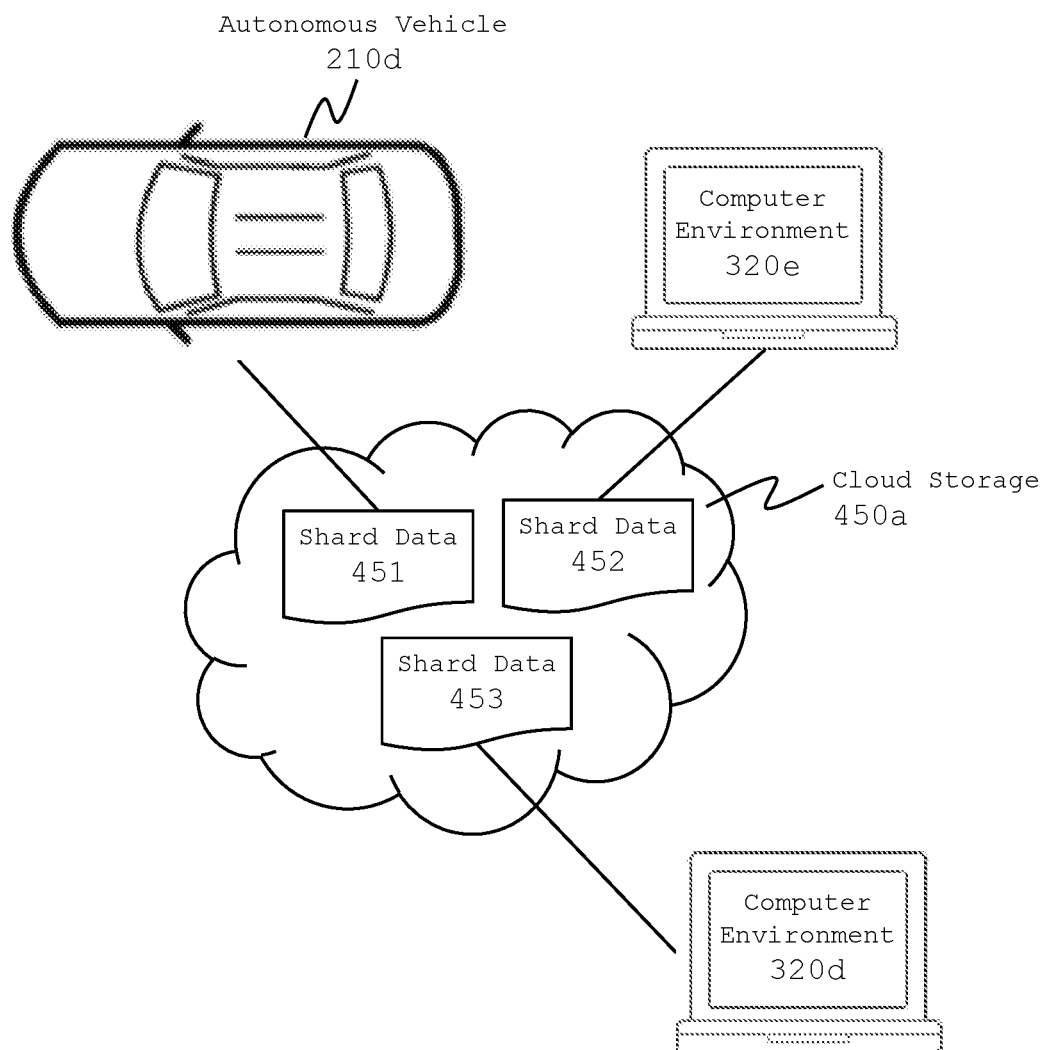
FIG. 5 is a diagram illustrating clients each using a dedicated copy of shard data, according to some embodiments of the disclosure.
Figure 6:
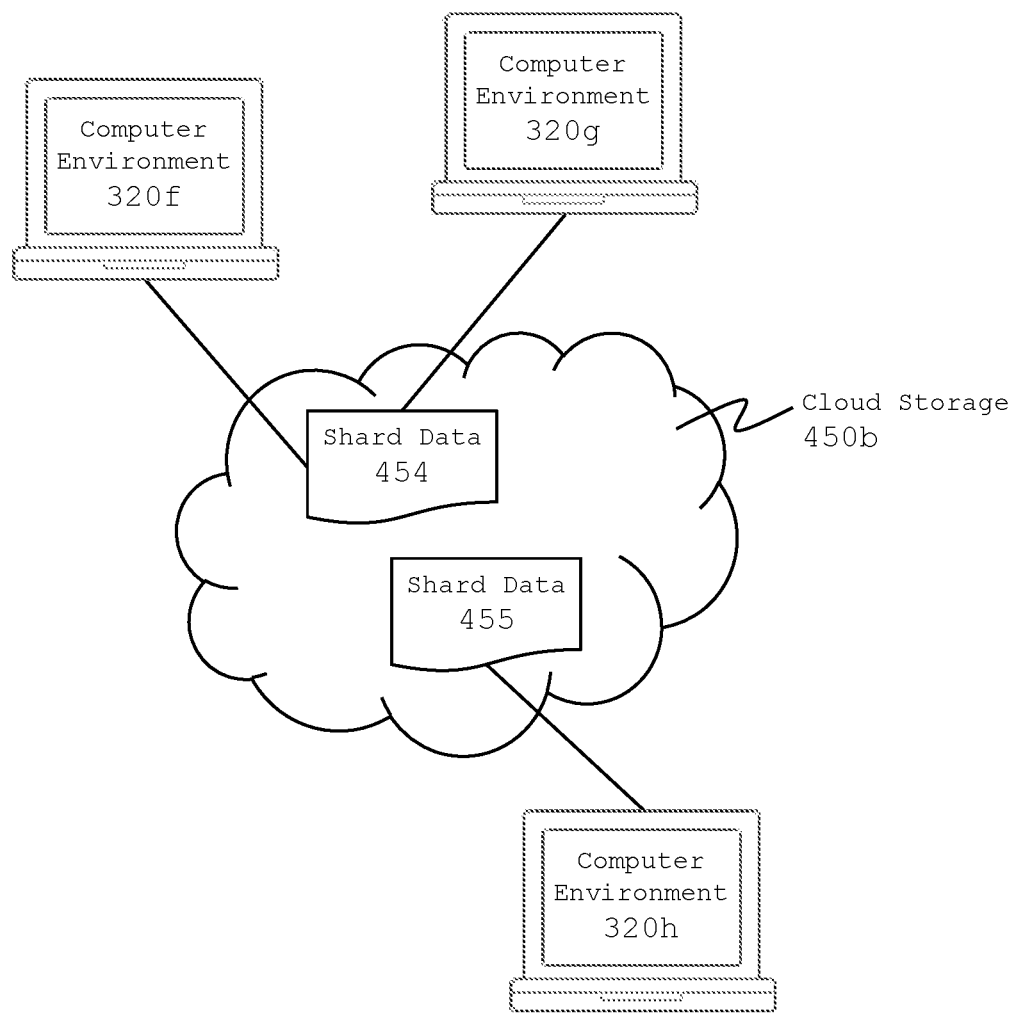
FIG. 6 is a diagram illustrating clients sharing shard data, according to some embodiments of the disclosure.

As shown in the example of FIG. 5, a cloud storage 450a may store shard data 451-453 for each of the clients, e.g., autonomous vehicles 210d and computer environments 320d-320e. To reduce the load on the cloud storage and network connections to the cloud storage, for example when offering dynamic loading of shard data, a cloud storage 450b may store shard data 454 that is shared by multiple clients, as shown in the example of FIG. 6. For example, computer environments 320f-320g may share shard data 454. In the example of FIG. 6, dedicated shard data 455 is available to client 320h.

Shard Guiding Sections

The shard guiding sections, such as the sections stored in the shard guiding database 412 of FIG. 4, may be obtained by splitting a geographical area into sections. A geographical area may be split into sections in various manners.

Figure 7:
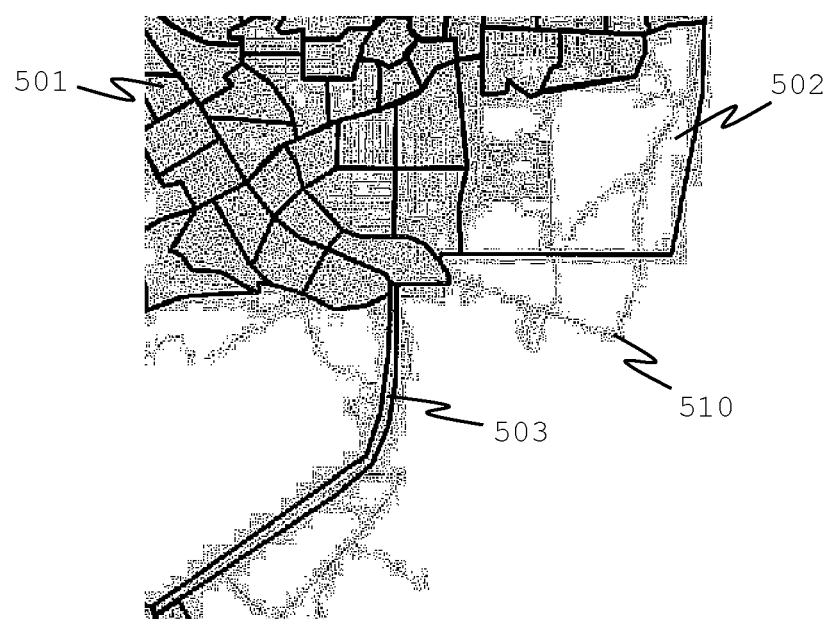
FIG. 7 is a geographical area that has been split in sections, according to some embodiments of the disclosure.

FIG. 7 shows an example of a geographical area 500, in this example a city, which has been split into sections, depicted by the dashed lines. Only three sections have been labeled in FIG. 7, i.e., section 501, section 502 and section 503. Sections can have different shapes and sizes. For example, section 501 is smaller and differently shaped compared to section 502. Section 503 is an example of an elongated section. Sections are typically non-overlapping, but it is possible that there are overlapping sections. It is possible that parts of the geographical area 500 are excluded from generating shards. In FIG. 7, the area 510 is an example of a part of the geographical area 500 that is not part of a section and will not be covered by a shard, e.g., because that part of the city cannot be reached by an autonomous vehicle.

One or more of the sections may be defined such that semantic objects with geometries located in the geographical area fit into the sections, possibly with small overlap to adjacent sections. Objects that overlap to adjacent sections may expand the bounding box of the shards.

The geographical area 500 may be split into sections differently, e.g., in larger sections in one area and in smaller sections in another area. Sections, and in particular smaller sections, preferably exclude undriveable areas in between roads on city blocks. Larger sections cover, e.g., neighborhoods of a city or smaller villages.

The above-described sections are to be understood as non-limiting examples of sections. Any other split of a geographical area into sections may be used as input to the map sharder 401 for the generation of semantic map shards.

In some embodiments, a computer algorithm may be used to split a geographical area into sections. In one example, the computer algorithm may be configured to recognize geographical features in a geometric mapping layer of the geographical area and define sections accordingly. In another example, the computer algorithm may be configured to determine a density of semantic objects at a location, e.g., using the semantic objects database 411, and define sections accordingly. The computer algorithm may include artificial intelligence algorithms to recognize features and/or objects in map data of a geographical area in support of splitting the geographical area into sections.

Figure 8:
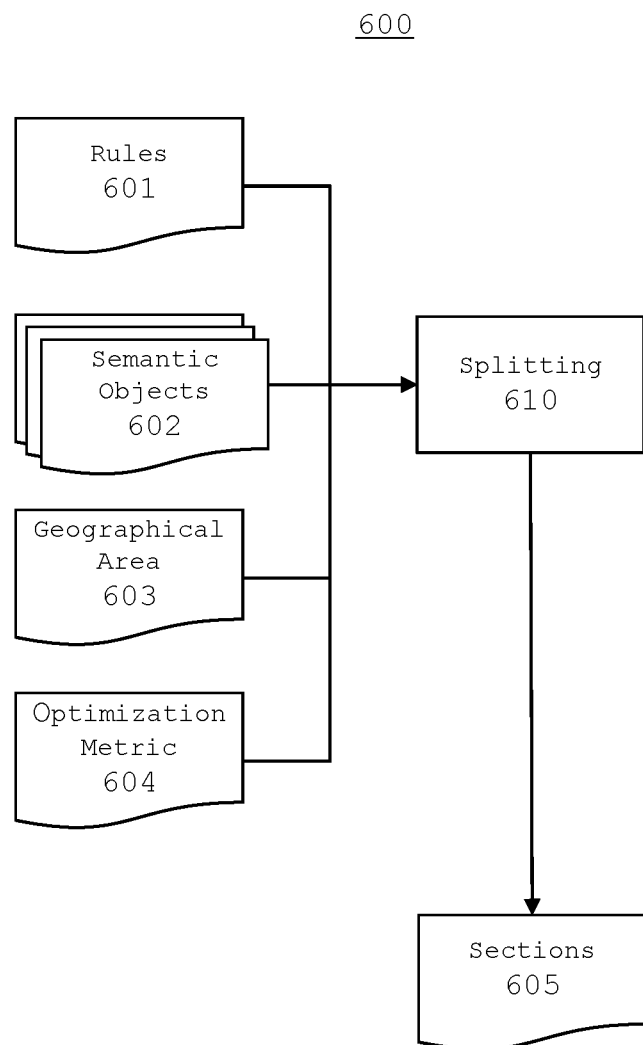
FIG. 8 is a flow diagram of a method for splitting a geographical area into sections, according to some embodiments of the disclosure.

In some embodiments, the computer algorithm for splitting a geographical area into sections may use a set of rules as input. FIG. 8 shows an example flow diagram 600 of a rules based splitting of a geographical area into sections by a computer algorithm. The sections may be stored in shard guiding sections database 412.

A set of rules 601 may be used to determine which semantic objects 602 are to be kept together in a shard. The rules 601 may be part of the computer algorithm 610 (depicted 'Splitting 610' in FIG. 8) or stored separately and addressed by the computer algorithm 610. The semantic objects may be obtained from the semantic objects database 411.

Based on the set of rules 601 and the semantic objects 602, the algorithm 610 may determine an optimal split of the geographical area 603 into sections 605. Herein, the geographical area may be input to the algorithm 610 as map data representative of the geographical area.

The algorithm 610 optionally uses an optimization metric 604 as further input to tune the algorithm 610 for optimal generation of sections 605. For example, the optimization metric 604 may instruct the algorithm to generate sections

605 that may result in shards that are optimized for memory usage, i.e., memory usage when a client processes the shard. Another example of an optimization metric defines a desired data storage size per shard, and results in sections 605 to be generated accordingly. Another example of an optimization metric defines a desired object density or number of objects within a section 605.

Generating Shard Data

Figure 9:
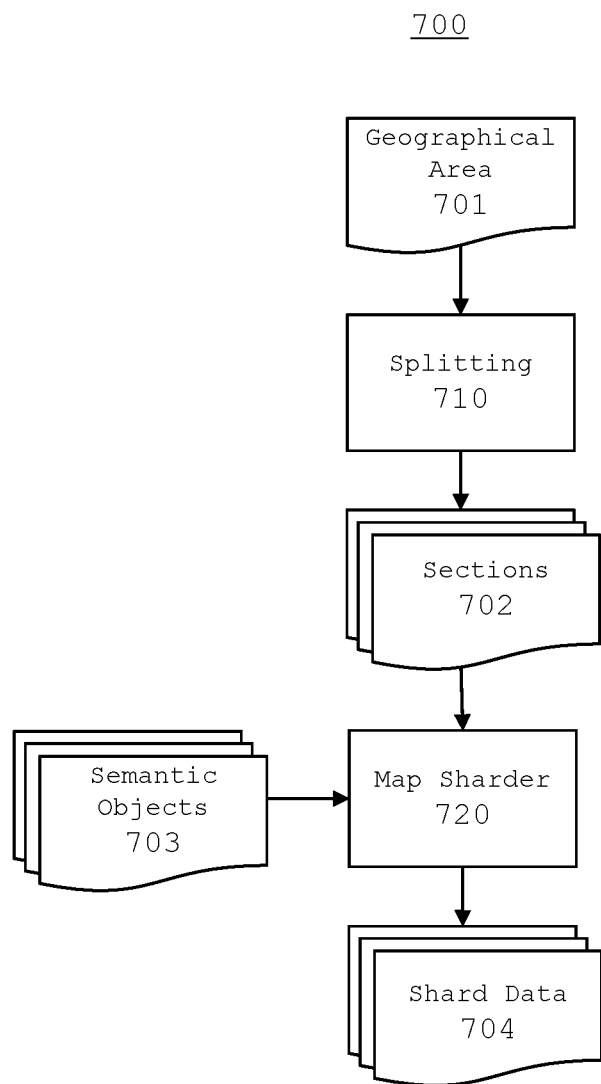
FIG. 9 is a flow diagram of a method for generating shard data, according to some embodiments of the disclosure.

As explained in the above example of FIG. 3, from the semantic objects, e.g., stored in semantic objects database 411, and the sections, e.g., stored in shard guiding sections database 412, the map sharder 401 may generate shard data. FIG. 9 shows a flow diagram 700 of a method for generating shard data 704, according to some embodiments.

The example of FIG. 9 shows data representative of a geographical area 701, which is input to a splitting function 710 (depicted 'Splitting 710' in FIG. 9). Output of the splitting function 710 are sections 702. A map sharder function 720 takes the sections 702 as input, together with semantic objects 703. The map sharder function 720 may generate the shard data 704 based on the sections 702 and semantic objects 703.

The data representative of a geographical area 701 may be split by splitting function 710 into sections 702. An example of a splitting function 710 is the splitting algorithm 610 of FIG. 8. An example of sections obtained by the splitting function are the sections 605 of FIG. 8. The thus obtained sections 702 may be stored, e.g., in shard guiding sections database 412.

The semantic objects 703 may be obtained from semantic objects database 411.

The map sharder function 720 may generate shard data 704 by looking up the semantic objects that are located in a section. The map sharder function 720 may furthermore calculate the bounding box for the shard covering these objects. The map sharder function 720 may be performed by map sharder 401.

Figure 10:
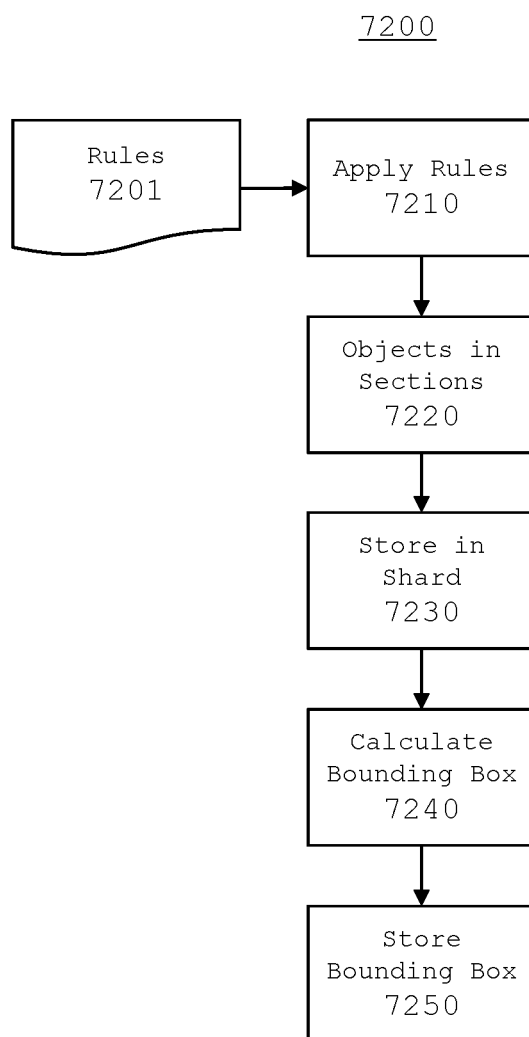
FIG. 10 is a flow diagram showing more details of a part of a method for generating shard data, according to some embodiments of the disclosure.

In some embodiments, the map sharder function 720, may involve a number of sub steps, such as shown in the flow diagram 7200 of FIG. 10.

In step 7210 (depicted 'Apply Rules 7210' in FIG. 10) it may be determined which objects can be stored together within a shard based on rules 7201. Rules 7201 may be similar or identical to rules 601.

In step 7220 (depicted 'Objects in Sections 7220' in FIG. 10) it may be determined which objects are located within a section. Hereto the geographical area covered by a section may be determined from the section, e.g., from a geographical reference stored with the section. The semantic objects database 411 may be searched for objects that are located within the geographical area covered by the section, e.g., from a geographical reference stored with each object in the semantic objects database 411.

In step 7230 (depicted 'Store in Shard 7230' in FIG. 10), objects that are found in step 7220 may be stored in a shard. The thus created shard may be stored in the shard-to-object relations database 414.

In step 7240 (depicted 'Calculate Bounding Box 7240' in FIG. 10) the bounding box may be calculated for a shard. The bounding box is indicative of the geographical area covered by the shard, which may be different from the geographical area of the section, as the object in the shard may be larger or smaller than the section. Step 7240 may be performed each time a shard has been created in step 7230. Alternatively, step 7240 may be performed when a plurality of shards, possibly all shards, have been created in step 7230, resulting in the bounding boxes being calculated for the plurality of shards in step 7230.

In step 7250 (depicted 'Store Bounding Box 7250' in FIG. 10) data indicative of the bounding box may be stored with the shard. The bounding box data may be stored as metadata, e.g., in shard metadata database 413.

In addition to generating shards based on the sections, shards may be generated covering larger areas, e.g., resulting in city-wide shards. These shards covering a larger area may be used for specific use cases or for specific type of objects.

As will be appreciated by one skilled in the art, the steps shown in FIG. 9 or FIG. 10 may be performed sequentially and/or in parallel for different shards to be generated. Steps may be repeated for different shards.

Rules for Placing Semantic Objects into Shards

A shard may include a single object or multiple objects. When generating shards, a set of rules, such as rules 7201, may be applied to determine which objects may be stored together in a shard.

For example, for map consistency reasons, lanes and their boundaries and/or lanes and their intersection may be stored together in a shard. As used herein, a lane is a portion of a roadway along which an autonomous vehicle can travel. A lane may be described by its boundaries, including a left boundary and a right boundary, and a direction of travel. In one example, a lane includes a portion of a roadway physically marked by painted lane lines, a median, reflective markers, or other demarcations. In another example, a lane includes a portion of a roadway on which autonomous vehicles travel by convention, e.g., the right-hand portion of a two-way street without a lane demarcation. In another example, a lane includes the full width of a roadway, e.g., for a single lane road. A lane may have start points and end points, e.g., a lane may start at one end of a given city block and end at the other end of the city block; a corresponding lane on the next city block may be considered a different lane, or a continuation of the same lane. A lane may extend through an intersection, or a portion of a roadway through an intersection may be considered a distinct lane from a corresponding portion before the intersection. In some examples, multiple lanes overlap. For example, at an intersection, each potential pathway for traveling through the intersection, including straight pathways and turning pathways, is considered a lane. As another example, in a rural area, a single lane road may allow travel in two directions, and the full width of the road in either direction of travel is considered a separate lane.

The rules 7201 may define objects with geometries and/or relationships between objects that may be stored together in a shard. Objects with geometries are typically affecting the shard bounding box, resulting in the bounding box being calculated and stored for the shard. Relationships between objects typically do not affect the shard bounding box and need not be taken into account when calculating a bounding box. The following are non-limiting examples of rules 7201.

The rules 7201 may define primary objects, that may be stored together in a shard. For example, it may be defined that closely related primary objects are stored together in a shard. Closely related primary objects are, e.g., lanes, boundaries and intersections that can be grouped together based on lane to boundary relationships and intersection identifications. These groups may form chunks that cannot be split into separate shards, as these objects are typically to be processed together by a client. These groups may preserve basic guarantees that a lane always has a boundary and intersection data is available to a client in the map for every lane. When generating shards, the geometries of a group of primary objects may be tested against sections, based on which the primary objects may be selected and stored in the shards.

The rules 7201 may define objects related directly to one and only one of the primary objects. If an object has a relationship to exactly one of the primary objects, the rules 7201 may define that the object may be placed in the same shard with that primary object. The relationship to the primary object may also be stored in the shard. Non-limiting examples of objects directly related to primary objects are: lane grade (related to a lane); conditional speed limit (related to a lane); and cross traffic lanes (related to an intersection).

The rules 7201 may define objects with large geometries or no relations to other objects that cannot be reasonably placed in one of the sections. These objects may be separated into their own shard per geographical area, e.g., in a shard covering a city instead of a section. Non-limiting examples of such objects are: a routable area; a school zone driveable area; and experimental areas for simulation purposes.

The rules 7201 may define objects with geometries, which may be added to the shards of the sections that contain most of that geometry. If two or more shards share equal parts, a tiebreaker may be implemented to ensure that the sharding is repeatable. Non-limiting examples of such objects with geometries are: a driveable area; an undriveable area; a rail line; a traffic sign; and a traffic light.

The rules 7201 may define objects closely related to an object with geometry, which may be placed into a shard together with the geometric object. The relationship with the geometrical object may also be stored in the shard. Non-limiting examples of objects closely related to objects with geometry are: a buffered crosswalk area (related to a driveable area); and a driveway entry (related to a driveway driveable area).

The rules 7201 may define relationships between objects that can be in different shards. These relationships are preferably stored with one of the objects. Non-limiting examples of such relationships are: lane connection (related to a start lane); and lane driveable area intersections (related to a lane).

Data Structure of a Shard

In some embodiments, the generated shard data, such as shard data 704, may be stored as database tables in a database. The shard data 704 may be stored in two tables: a shard metadata table, such as shard metadata database 413, and a shard relations table, such as shard-to-object relations database 414.

In an example, the shard metadata database 413 may include one or more of the following fields:
  id, i.e., an identifier of the shard that may be used as foreign key in the shard-to-object relations database 414. The id is for example stored as an integer value;
  subtype, i.e., a non-unique string representing the type of shard. The subtype is for example stored as a string value;
  name, i.e., a unique string representing the name of the shard. The name is for example stored as a string value;
  {min_x, min_y, max_x, max_y}, i.e., four values defining the corners of a bounding box. These values are for example stored as floating-point values.

The subtype field in the shard metadata database 413 may be populated based on whether a shard contains data about objects related to sections (e.g., stored as subtype="small" in case of being related to a small section), city-wide objects (e.g., stored as subtype="city") or objects for experiments for simulation purposes (e.g., stored as subtype="experiment"). Other subtype values may be used for these and/or other types of shards.

The name of the shard in the shard metadata database 413 may be constructed from the subtype and a sequence number. For example, the following names may be given to shards: small_1, small_2, small_3, and etcetera. Other naming schemes may be used to uniquely name the shards.

The shard-to-object relations database 414 may store information identifying the objects stored in the shards. This information may include relations between shards and objects as may be defined by the rules 7201.

In an example, the shard-to-object relations database 414 may include one or more of the following fields:
  shard_id, i.e., a foreign key to the shard relations table. The shard_id is for example stored as an integer value;
  feature_table, i.e., a name of the feature table or a name identifying the shard. The feature_table is for example stored as a string value;
  feature_id, i.e., an identifier of the feature or objects in the feature table. The feature_id is for example stored as an integer value.

Exporting Shard Data from a Database Storage

Figure 11:
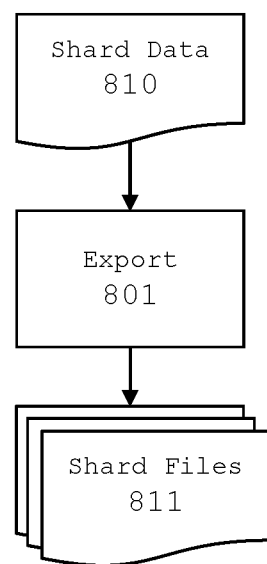
FIG. 11 is a flow diagram of a method for exporting shards from a shard database, according to some embodiments of the disclosure.

Preferably, the shard data stored in the database storage is exported for storage outside of the database before being used by a client. FIG. 11 shows a flow diagram 800 of a method for exporting shard data from the database, according to some embodiments. Shard data 810 stored in the database, e.g., shard data 704 stored as shard metadata database 413 and shard-to-object relations database 414 in database storage 410, may be retrieved from the database by an export function 801 (depicted 'Export 801' in FIG. 11). The exporting function 801 may be executed by database exported 420. Based on the shard data retrieved from the database, the exporting function 801 may generate shard files 811 that are stored in a file storage system, such as file storage system 430. Each shard file preferably stores data for one shard. Shard metadata may be stored in one or more separate files with the shard files 811.

In some embodiments, the export function 801 creates a shards directory containing the shard files and a metadata file, e.g., a json file "metadata.json". The metadata file may include a list of shard file names with their respective subtype and bounding box information. This metadata information may be used by an uploader function, such as uploader 440, to upload shard metadata and the shard files to clients or a cloud storage.

The following is an example of an entry in the metadata.json file for one shard: {"name": "meta_1.bp", "subtype": "meta", "min_x": −100.0, "min_y": −200.1, "max_x": 145.2, "max_y": −100.4}. Herein, the name, subtype, min_x, min_y, max_x and max_y fields may be given the values from the corresponding fields in the shard metadata database 413. The name field in the metadata.json file may furthermore include a filename extension, such as ".bp" in this example. The full name in the metadata.json file may thus refer to the filename "meta_1.bp" of the shard.

Figure 12:
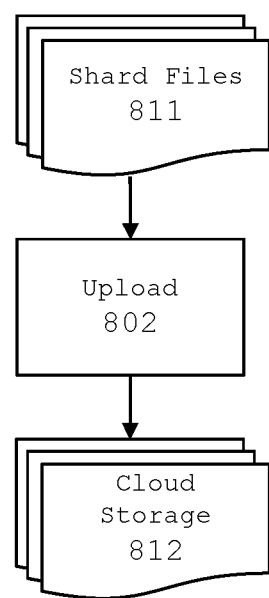
FIG. 12 is a flow diagram of a method for uploading shards to a storage, according to some embodiments of the disclosure.

In some embodiments, the shard files 811 may be uploaded by an uploader function 802 to a client or cloud storage before being used by a client, which is shown in flow diagram 850 of FIG. 12. The uploader function may be performed by shard uploader 441.

In step 802 (depicted 'Upload 802' in FIG. 12) the shard files 811 may be read and uploaded to a cloud storage 812. The cloud storage may include a content addressable storage (CAS) for storing the shards for performance enhancements.

Shards and shard meta data may be stored separately, possibly in separate cloud locations, such as shown in the example of FIG. 4.

In some embodiments, the shard files 811 and metadata include a hash value of the identifier of the shard, e.g., a SHA256 identifier.

Selection and Delivery of Shards to a Client

Figure 13:
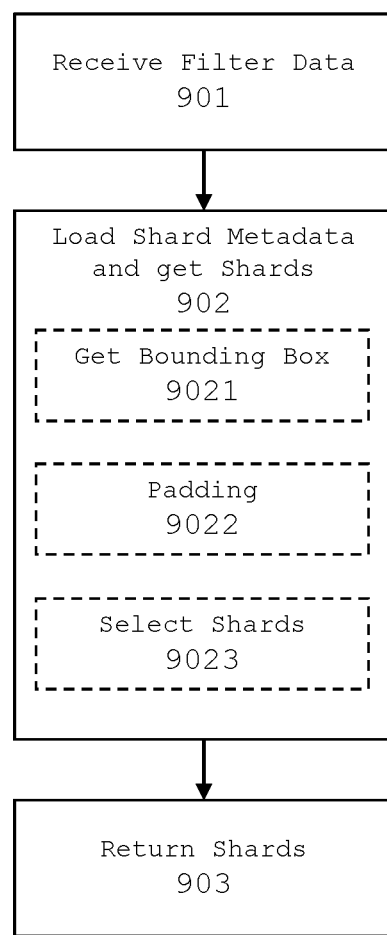
FIG. 13 is a flow diagram of a method for requesting shards by a client, according to some embodiments of the disclosure.

FIG. 13 shows a flow diagram 900 of a method for selection and delivery of shard data to a client, according to some embodiments.

In step 901 (depicted 'Receive Filter Data 901' in FIG. 13) filter data may be received from a client indicative of the map data that is requested by the client. The filter data may include bounding box related information indicative of the geographical area for which shards are requested. The filter may include further filter information. Non-limiting examples of further filter information are data indicative of a specific path and information for selecting a specific layer of map data, e.g., only primary objects.

In step 902 (depicted 'Load Shard Metadata and get Shards 902' in FIG. 13), shard metadata may be loaded, e.g., from the metadata.json file of the example of FIG. 11 or from metadata stored in a cloud storage 460 of FIG. 4. The filter data, in particular the bounding box information provided in the filter data, may be correlated against the bounding box data in the shard metadata to find the relevant shard files. The shards fulfilling the request from the client may be returned to the client in step 903 (depicted 'Return Shards 903' in FIG. 13).

For example, the bounding box information provided in the filter data may indicate a request for shards in an area defined by min_x=−90, min_y=−200, max_x=144 and max_y=−110. The metadata for small_1.bp in the example above covers this area, with a bounding box of min_x=−100.0, min_y=−200.1, max_x=145.2 and max_y=−100.4. Step 902 may thus result in shard data in the form of file small_1.bp being returned to the client.

Step 902 may include one or more sub steps, indicated as dashed boxes 9021, 9022 and 9023 in FIG. 13. In step 9021 (depicted 'Get Bounding Box 9021' in FIG. 13) the filter data may be analyzed and bounding box information may be obtained from the client request. If a bounding box is present, shards that do not overlap with the bounding box may be expanded by a configurable padding or buffer zone in step 9022 (depicted 'Padding 9022' in FIG. 13). This effectively temporarily enlarges the areas covered by these shards. Padding may be required, e.g., to account for the distance between the autonomous vehicle and the farthest object that affects autonomous vehicle behavior. In step 9023 (depicted 'Select Shards 9023' in FIG. 13) the shards may be selected based on the filter data and the expanded bounding boxes.

Figure 14:
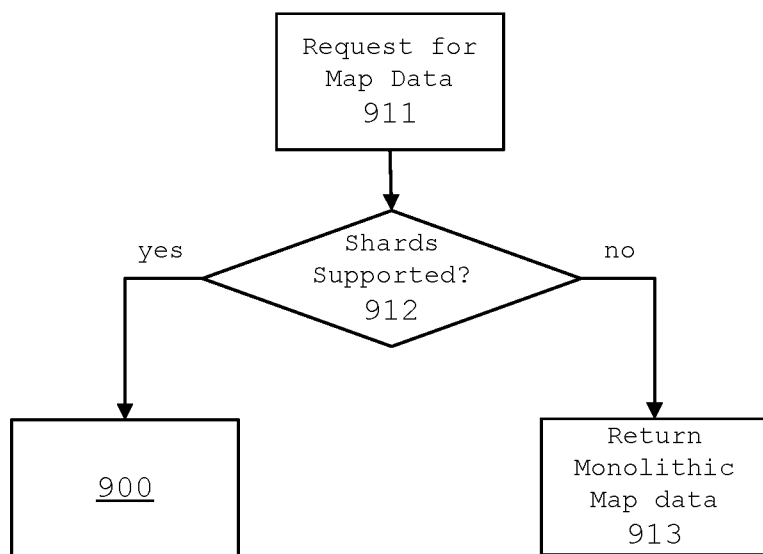
FIG. 14 is a flow diagram of a method for requesting map data by a client, according to some embodiments of the disclosure.

In some embodiments, shards may not be available in an area requested by the filter data or shards may not be supported by one or more of the clients. FIG. 14 shows a flow diagram 910 of a method for supporting delivery of a monolithic map data in such cases. In step 911 a request for map data may be received from a client. In step 912 it may be determined whether shards are supported by the client and shard data is available in the requested area. If shards are available and supported, the flow diagram 900 may be followed. Otherwise, in step 913 monolithic map data may be returned. It is possible that at a later stage it is determined that shard data is not available, e.g., in step 902 of FIG. 13. Also, in that case monolithic map data may be returned to the client instead of shard data.

Dynamic Loading of Shards by Clients

All shard data required by a client, e.g., to perform a ride from start to destination or to perform software simulations, may be delivered to the client at once after a request is received by a client. Alternatively, shard data may be loaded dynamically, allowing only shards that are currently used to be requested and delivered to clients and further shards to be delivered when needed. For example, an autonomous vehicle traveling 20 km from start to destination may request shards for an area of 500 m around the vehicle at a time, only requesting further shards when reaching 250 m from the edge of the 500 m area. This dynamic loading of shards of radially 500 m areas around the vehicle may continue until the 20 km ride has finished.

Figure 15:
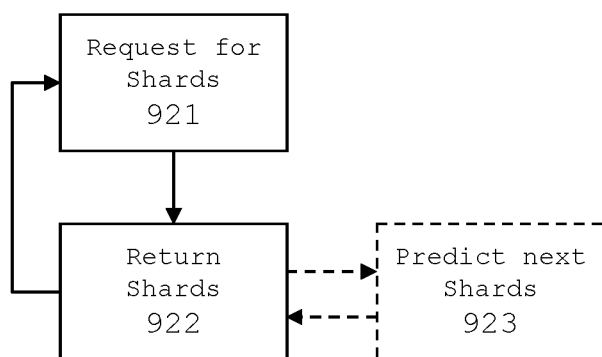
FIG. 15 is a flow diagram of a method for dynamically loading shards for a client, according to some embodiments of the disclosure.

FIG. 15 shows a flow diagram 920 of a method for dynamic loading of shard data, according to some embodiments. In step 921 a request for shards may be received from a client. In step 922 (depicted 'Return Shards 922' in FIG. 15) the shards that are currently needed may be found and returned to the client, e.g., using a process similar to step 902 in FIG. 13. The method 920 may be repeated to provide further shards to the client when needed.

In an embodiment, the process of dynamic loading of shards may be optimized by predicting which shards will be requested by the client next. The predicted shards may be preloaded to minimize latency between the request from the client and delivery of the next shards. In step 923 (depicted 'Predict next Shards 923' in FIG. 15) it may be predicted which shard data will be requested next, e.g., based on a direction of driving or based on an end-to-end route if known. Step 923 may result in the next shards to be preloaded.

In an example, shards that are required for a specific trip may be preloaded for a client and the client may request shard loading while stationary after calculating the route for a next trip.

Example of a Computing System for Semantic Map Sharding

Figure 16:
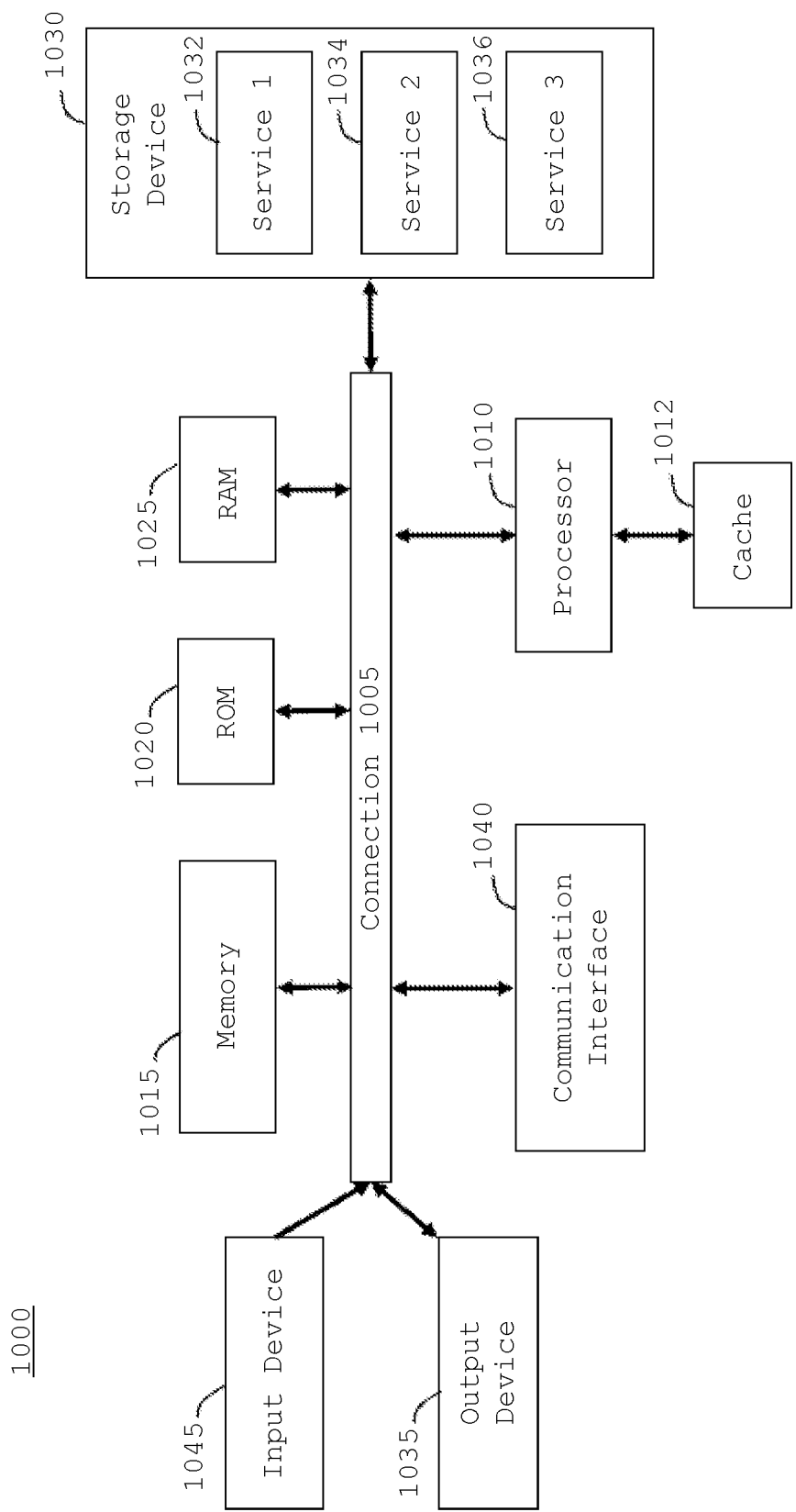
FIG. 16 shows an example embodiment of a system for implementing certain aspects of the present technology.

FIG. 16 shows an example embodiment of a computing system 1000 for implementing certain aspects of the present technology. In various examples, the computing system 1000 can be any computing device making up the onboard computer 104, the central computer 202, onboard computer 220a-220c, CI server 310, computer environment 320a-320c, source control server 330, any part of the system architecture 400, such as map sharder 401, database storage 410, database exporter 420, file storage system 430, uploader 440, or any other computing system described herein.

In some implementations, a computing system 1000 can implement the methods described herein, such as to generate shards.

The computing system 1000 can include any component of a computing system described herein which the components of the system are in communication with each other using connection 1005. The connection 1005 can be a physical connection via a bus, or a direct connection into processor 11010, such as in a chipset architecture. The connection 1005 can also be a virtual connection, networked connection, or logical connection.

In some implementations, the computing system 1000 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 1000 includes at least one processing unit (CPU or processor) 1010 and a connection 1005 that couples various system components including system memory 1015, such as read-only memory (ROM) 1020 and random-access memory (RAM) 1025 to processor 1010. The computing system 1000 can include a cache of high-speed memory 1012 connected directly with, in close proximity to, or integrated as part of the processor 1010.

The processor 1010 can include any general-purpose processor and a hardware service or software service, such as services 1032, 1034, and 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction, the computing system 1000 includes an input device 1045, which can represent any number of input mechanisms, such as a microphone for speech, a touch-sensitive screen for gesture or graphical input, keyboard, mouse, motion input, speech, etc. The computing system 1000 can also include an output device 1035, which can be one or more of a number of output mechanisms known to those of skill in the art. In some instances, multimodal systems can enable a user to provide multiple types of input/output to communicate with the computing system 1000. The computing system 1000 can include a communications interface 1040, which can generally govern and manage the user input and system output. There is no restriction on operating on any particular hardware arrangement, and therefore the basic features here may easily be substituted for improved hardware or firmware arrangements as they are developed.

A storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMS), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as a processor 1010, a connection 1005, an output device 1035, etc., to carry out the function.

Select Examples

The following paragraphs provide various examples of the embodiments disclosed herein.

Examples of Systems and Methods for Generating Shard Data Based on Semantic Map Sharding Example 1 provides a system for generating shard data. The system may include a map sharder configured to generate shard data from a first data input including semantic objects in a geographical area and a second data input including a definition of sections. The sections may cover parts of the geographical area. The map sharder may be configured to generate the shard data by searching, for each of the sections, for semantic objects that are located at least partly in a section and to store found objects in a shard data entry of the shard data.

Example 2 provides a system according to example 1, wherein the map sharder is further configured to calculate a bounding box for the shard data entry based on the objects stored in the shard data entry. The map sharder may further be configured to store data representative of the bounding box with the shard data entry.

Example 3 provides a system according to example 2, wherein the map sharder is configured to calculate bounding boxes for all shard data entries after generating all shard data entries.

Example 4 provides a system according to example 2 or example 3, wherein the shard data includes a first database configured to store metadata for each of the shard data entries. The metadata may include the data representative of the bounding box. The shard data may further include a second database configured to store data indicative of objects located in each of the shard data entries.

Example 5 provides a system according to any one of the examples 1-4, wherein the map sharder is configured to generate the shard data further based on rules. The rules may include a definition of which semantic objects are to be combined into a single shard data entry and which semantic objects are to be stored in separate shard data entries.

Example 6 provides a system according to example 5, wherein the rules define one or more of: closely related primary objects, which are to be grouped together in a single shard; objects related to one or more primary objects, which are to be stored in the same shard data entry as the related primary object; objects with large geometries or no relations to other objects that cannot be reasonably placed in one of the sections, which are to be stored in separate shard data entries; objects with geometries, which are to be added to a shard entry of a section that contains most of that geometry; objects closely related to an object with geometry, which are to be stored into a shard data entry together with the geometric object; and relationships between objects in different shards data entries, which are to be stored with one of the objects.

Example 7 provides a system according to any one of the examples 1-6, further including a database exporter. The database exporter may be configured to generate shard data files from the shard data. One shard data file typically includes data for one shard data entry. The system may further include a file storage system. The file storage system may be configured to store the shard data files.

Example 8 provides a system according to example 7, wherein the database exporter is further configured to generate a metadata file. The metadata file may include bounding box information for the shard data entries. The file storage system may further be configured to store the metadata file.

Example 9 provides a system according to example 7 or example 8, wherein the database exporter is further configured to generate monolithic map data. The file storage system may further be configured to store the monolithic map data.

Example 10 provides a system according to any one of the examples 7-9, further including an uploader. The uploader may be configured to upload the shard data files to a cloud storage.

Example 11 provides a system according to example 8, further including an uploader. The uploader may be configured to upload the metadata file to a cloud storage.

Example 12 provides a method for generating shard data. The method may include receiving, in a map sharding function, a first data input including semantic objects in a geographical area. The method may further include receiving, in the map sharding function, a second data input including a definition of sections. The sections may cover parts of the geographical area. The method may further include searching, by the map sharding function, for each of the sections, for semantic objects that are located at least partly in a section. The method may further include storing, by the map sharding function, found objects in a shard data entry of the shard data.

Example 13 provides a method according to example 12, further including calculating, by the map sharding function, a bounding box for the shard data entry based on the objects stored in the shard data entry. The method may further include storing, by the map sharding function, data representative of the bounding box with the shard data entry.

Example 14 provides a method according to example 13, wherein the data representative of the bounding box is stored as metadata separate from the shard data entries.

Example 15 provides a method according to any one of the examples 12-14, further including receiving, in the map sharding function, rules. The rules may include a definition of which semantic objects are to be combined into a single shard data entry and which semantic objects are to be stored in separate shard data entries. The searching of semantic objects may further be based on the rules.

Example 16 provides a method according to any one of the examples 12-15, further including exporting, by an export function, the shard data to a file storage system by storing each shard data entry as a separate data file in the file storage system.

Example 17 provides a method according to example 14, further including exporting, by the export function, the metadata to a file storage system.

Example 18 provides one or more non-transitory computer-readable storage media including instruction for execution which, when executed by a processor, are operable to perform operations for generating shard data. The operations may include inputting a first data input including semantic objects in a geographical area. The operations may further include inputting a second data input including a definition of sections. The sections may cover parts of the geographical area. The operations may further include, for each of the sections in the second data input, searching the first data input for semantic objects that are located at least partly in the section to obtain found objects. The operations may further include outputting data representative of found objects for storage in a shard data entry of the shard data.

Example 19 provides one or more non-transitory computer-readable storage media according to example 18, wherein the operations further include calculating a bounding box for the shard data entry based on the found objects for the shard data entry. The operations may further include outputting data representative of the bounding box for storage with the shard data entry.

Example 20 provides one or more non-transitory computer-readable storage media according to example 18 or example 19, wherein the operations further include inputting rules. The rules may include a definition of which semantic objects are to be combined into a single shard data entry and which semantic objects are to be stored in separate shard data entries. The searching the first data input for semantic objects may further be based on the rules.

Examples of Systems and Methods for Delivering Shard Data to a Client

Example 21 provides a method for delivering shard data to a client. The method may include receiving filter data from the client. The filter data may be indicative of which map data is requested by the client. The method may further include searching for shards that fulfill the filter data. The method may further include returning the shards that fulfill the filter data to the client.

Example 22 provides a method according to example 21, wherein the filter data includes data indicative of a bounding box. The searching of shards may use the data indicative of the bounding box to find shards that at least partly overlap the bounding box.

Example 23 provides a method according to example 22, wherein shards that do not overlap with the bounding box are expanded in size by a predefined padding. The expanded shards may be used to find shards that at least partly overlap the bounding box.

Example 24 provides a method according to any one of the examples 21-23, further including returning monolithic map data to the client instead of shards in case no shards are found that fulfill the filter data or in case the filter data indicates that shards are not supported.

Example 25 provides a system for delivering shard data to a client. The system may be configured to perform the method according to any one of the examples 21-24.

Examples of Systems and Methods for Dynamic Loading of Shard Data

Example 26 provides a system for dynamically loading shards. The system may include a receiver configured to receive a request for shard data from a client. The system may further include a processor configured to search for shards that are currently needed by the client based on the request. The system may further include a transmitter configured to return the found shards to the client. The system may be configured to repeatedly receive requests from the client and provide shards to the client.

Example 27 provides a system according example 26, wherein the processor is configured to preload shards based on a direction of driving derived from previously returned shards or based on data indicative of an end-to-end route provided by the client. The transmitter may be configured to return a preloaded shard.

Example 28 provides a system according to example 26 or example 27, further including a dedicated data storage dedicated to the client. The dedicated data storage may store shard data from where shards are searched to be returned to the client.

Example 29 provides a system according to any one of the examples 26-28, further including a shared data storage that is shared between two or more clients. The shared data storage may store shard data from where shards are searched to be returned to the client.

Example 30 provides a method for dynamically loading shards. The method may include receiving a request for shard data from a client. The method may further include searching for shards that are currently needed by the client based on the request. The method may further include transmitting the found shards to the client. The method may further include repeating these steps for further requests from the client.

Example 31 provides a method according to example 30, wherein the method further includes preloading shards based on a direction of driving derived from previously returned shards or based on data indicative of an end-to-end route provided by the client. The method may further include transmitting a preloaded shard to the client.

Examples of Method for Generating Shard Data from a Geographical Area Split in Sections Example 32 provides a method for generating shard data using data representative of a geographical area that is split into sections and data representative of semantic objects located in the geographical area. The method may include searching, for each of the sections, for semantic objects that are located at least partly in a section. The method may further include generating a shard data entry of the shard data. The shard data entry may include one or more semantic objects found by the searching.

Example 33 provides a method according to example 32, wherein searching and generating are repeated for all sections.

Example 34 provides a method according to example 33, wherein, after all shard data entries have been generated, a semantic object is located in only one shard data entry.

Example 35 provides a method according to example 33 or example 34, wherein, after all shard data entries have been generated, all semantic objects are contained in the shard data.

Example 36 provides a method according to any one of the examples 32-35, wherein the geographical area covers one of a city, a region or a country.

Example 37 provides a method according to any one of the examples 32-36, wherein the data representative of the geographical area is split into sections. A section may be defined such that semantic objects with geometries located in the geographical area fit into the section, possibly with small overlap to one or more adjacent sections.

Example 38 provides a method according to any one of the examples 32-37, wherein the method may further use rules. The rules may include a definition of which semantic objects are to be combined into a single shard data entry and which semantic objects are to be stored in separate shard data entries. The searching may use the rules to find semantic objects that fulfill the rules.

Example 39 provides a method according to example 38, wherein the rules are defined to include one or more of: closely related primary objects, which are to be grouped together in a single shard; objects related to one or more primary objects, which are to be stored in the same shard data entry as the related primary object; objects with large geometries or no relations to other objects that cannot be reasonably placed in one of the sections, which are to be stored in separate shard data entries; objects with geometries, which are to be added to a shard entry of a section that contains most of that geometry; objects closely related to an object with geometry, which are to be stored into a shard data entry together with the geometric object; and relationships between objects in different shards data entries, which are to be stored with one of the objects.

Example 40 provides a method according to example 39, wherein the primary objects include one or more of: lanes; boundaries; and intersections that can be grouped together based on lane to boundary relationships and intersection identifications.

Example 41 provides a method according to example 39 or example 40, wherein the objects related to one or more primary objects include one or more of: lane grade (related to a lane); conditional speed limit (related to a lane); and cross traffic lanes (related to an intersection).

Example 42 provides a method according to any one of the examples 39-41, wherein the objects with large geometries or no relations to other objects include one or more of: a routable area; a school zone driveable area; and experimental areas for simulation purposes.

Example 43 provides a method according to any one of the examples 39-42, wherein the objects with geometries include one or more of: a driveable area; an undriveable area; a rail line; a traffic sign; and a traffic light.

Example 44 provides a method according to any one of the examples 39-43, wherein the objects closely related to an object with geometry include one or more of: a buffered crosswalk area (related to a driveable area); and a driveway entry (related to a driveway driveable area).

Example 45 provides a method according to any one of the examples 39-44, wherein the relationships between objects in different shards data entries include one or more of: lane connection (related to a start lane); and lane driveable area intersections (related to a lane).

Example 46 provides one or more non-transitory computer-readable storage media, including instruction for execution which, when executed by a processor, are operable to perform operations for generating shard data. The operations may include loading data representative of a geographical area that has been split into sections. The operations may further include loading data representative of semantic objects in the geographical area. The operations may further include searching, for each of the sections, for semantic objects that are located at least partly in a section. The operations may further include outputting a shard data entry of the shard data. The shard data entry may include data representative of one or more semantic objects found by the searching.

Example 47 provides one or more non-transitory computer-readable storage media according to example 46, wherein the searching and outputting are repeated for all sections that are loaded with the loading of data representative of the geographical area that has been split into sections.

Example 48 provides one or more non-transitory computer-readable storage media according to example 46 of example 47, wherein the operations further include loading data representative of rules. The rules may include a definition of which semantic objects are to be combined into a single shard data entry and which semantic objects are to be stored in separate shard data entries. The searching may use the rules to find semantic objects that fulfill the rules.

Example 49 provides one or more non-transitory computer-readable storage media according to any one of the examples 46-48, wherein the rules are defined to include one or more of: closely related primary objects, which are to be grouped together in a single shard; objects related to one or more primary objects, which are to be stored in the same shard data entry as the related primary object; objects with large geometries or no relations to other objects that cannot be reasonably placed in one of the sections, which are to be stored in separate shard data entries; objects with geometries, which are to be added to a shard entry of a section that contains most of that geometry; objects closely related to an object with geometry, which are to be stored into a shard data entry together with the geometric object; and relationships between objects in different shards data entries, which are to be stored with one of the objects.

Example 50 provides one or more non-transitory computer-readable storage media according to any one of the examples 46-49, wherein a section is defined such that semantic objects with geometries located in the geographical area fit into the section, possibly with small overlap to one or more adjacent sections.

Example 51 provides one or more non-transitory computer-readable storage media according to any one of the examples 46-50, wherein, after all shard data entries have been generated, all semantic objects are contained in the shard data.

Examples of Methods for Splitting a Geographical Area into Sections for Semantic Map Sharding Example 52 provides a method for generating sections. The method may include receiving data representative of semantic objects in a geographical area. The method may further include receiving a set of rules. The rule may include a definition of which semantic objects are to be combined into a single shard data entry and which semantic objects are to be stored in separate shard data entries. The method may further include analyzing data representative of the geographical area to determine an optimal split of the geographical area into sections based on the semantic objects and the rules, and generating the sections accordingly.

Example 53 provides a method according to example 52, further including receiving an optimization metric. The optimization metric may include instructions for one or more of: generate shards that are optimized for memory usage; a desired data storage size per shard; and a desired object density or number of objects within an area that may be stored in a shard. The analyzing may further be based on the optimization metric.

Example 54 provides a method according to example 52 or example 53, wherein the geographical area covers one of a city, a region or a country.

Example 55 provides a method according to any one of the examples 52-54, wherein the set of rules includes one or more of the following definitions: closely related primary objects are to be grouped together in a single shard; objects related to one or more primary objects are to be stored in the same shard data entry as the related primary object; objects with large geometries or no relations to other objects that cannot be reasonably placed in one of the sections are to be stored in separate shard data entries; objects with geometries are to be added to a shard entry of a section that contains most of that geometry; objects closely related to an object with geometry are to be stored into a shard data entry together with the geometric object; and relationships between objects in different shards data entries are to be stored with one of the objects.

Example 56 provides a method according to example 55, wherein the primary objects include one or more of: lanes; boundaries; and intersections that can be grouped together based on lane to boundary relationships and intersection identifications.

Example 57 provides a method according to example 55 or example 56, wherein the objects related to one or more primary objects include one or more of: lane grade (related to a lane); conditional speed limit (related to a lane); and cross traffic lanes (related to an intersection).

Example 58 provides a method according to any one of the examples 55-57, wherein the objects with large geometries or no relations to other objects include one or more of: a routable area; a school zone driveable area; and experimental areas for simulation purposes.

Example 59 provides a method according to any one of the examples 55-58, wherein the objects with geometries include one or more of: a driveable area; an undriveable area; a rail line; a traffic sign; and a traffic light.

Example 60 provides a method according to any one of the examples 55-59, wherein the objects closely related to an object with geometry include one or more of: a buffered crosswalk area (related to a driveable area); and a driveway entry (related to a driveway driveable area).

Example 61 provides a method according to any one of the examples 55-60, wherein the relationships between objects in different shards data entries include one or more of: lane connection (related to a start lane); and lane driveable area intersections (related to a lane).

Examples of Methods for Rules Based Semantic Map Sharding

Example 62 provides a method of handling semantic objects for semantic map sharding. The method may include defining semantic objects in a geographical area to be contained in shard data. The method may further include determining for the semantic objects a set of rules. The rules may include a definition of which semantic objects are to be combined into a shard data entry of the shard data and which semantic objects are to be stored in separate shard data entries.

Example 63 provides a method according to example 62, wherein the semantic objects include one or more of: primary objects; objects related to one or more primary objects; objects with large geometries or no relations to other objects; objects with geometries; and objects closely related to an object with geometry. The rules may include definitions for one or more of: closely related primary objects, which are to be grouped together in a single shard; objects related to one or more primary objects, which are to be stored in the same shard data entry as the related primary object; objects with large geometries or no relations to other objects that cannot be reasonably placed in one sections, which are to be stored in separate shard data entries; objects with geometries, which are to be added to a shard entry of a section that contains most of that geometry; objects closely related to an object with geometry, which are to be stored into a shard data entry together with the geometric object; and relationships between objects in different shards data entries, which are to be stored with one of the objects.

Example 64 provides a method according to example 63, wherein the primary objects include one or more of: lanes; boundaries; and intersections that can be grouped together based on lane to boundary relationships and intersection identifications.

Example 65 provides a method according to example 63 or example 64, wherein the objects related to one or more primary objects include one or more of: lane grade (related to a lane); conditional speed limit (related to a lane); and cross traffic lanes (related to an intersection).

Example 66 provides a method according to any one of the examples 63-65, wherein the objects with large geometries or no relations to other objects include one or more of: a routable area; a school zone driveable area; and experimental areas for simulation purposes.

Example 67 provides a method according to any one of the examples 63-66, wherein the objects with geometries include one or more of: a driveable area; an undriveable area; a rail line; a traffic sign; and a traffic light.

Example 68 provides a method according to any one of the examples 63-67, wherein the objects closely related to an object with geometry include one or more of: a buffered crosswalk area (related to a driveable area); and a driveway entry (related to a driveway driveable area).

Example 69 provides a method according to any one of the examples 63-68, wherein the relationships between objects in different shards data entries include one or more of: lane connection (related to a start lane); and lane driveable area intersections (related to a lane).

Example 70 provides a method according to any one of the examples 62-69, further including searching for semantic objects that are located at least partly in a section of the geographical area. The geographical area may be split in multiple sections. The method may further include assigning one or more semantic objects found by the searching to the shard data entry of the shard data.

Example 71 provides a method according to example 70, wherein, after all shard data entries have been generated, a semantic object is located in only one shard data entry.

Example 72 provides a method according to example 70 or example 71, wherein, after all shard data entries have been generated, all semantic objects are contained in the shard data.

Example 73 provides one or more non-transitory computer-readable storage media including instruction for execution which, when executed by a processor, are operable to perform operations for handling semantic objects for semantic map sharding. The operations may include loading data representative of semantic objects in a geographical area to be contained in shard data. The operations may further include loading a set of rules. The rules may include a definition of which semantic objects are to be combined into a shard data entry of the shard data and which semantic objects are to be stored in separate shard data entries.

Example 74 provides one or more non-transitory computer-readable storage media according to example 73, wherein the semantic objects include one or more of: primary objects; objects related to one or more primary objects; objects with large geometries or no relations to other objects; objects with geometries; and objects closely related to an object with geometry. The rules may include definitions for one or more of: closely related primary objects, which are to be grouped together in a single shard; objects related to one or more primary objects, which are to be stored in the same shard data entry as the related primary object; objects with large geometries or no relations to other objects that cannot be reasonably placed in one sections, which are to be stored in separate shard data entries; objects with geometries, which are to be added to a shard entry of a section that contains most of that geometry; objects closely related to an object with geometry, which are to be stored into a shard data entry together with the geometric object; and relationships between objects in different shards data entries, which are to be stored with one of the objects.

Example 75 provides one or more non-transitory computer-readable storage media according to example 74, wherein the primary objects include one or more of: lanes; boundaries; and intersections that can be grouped together based on lane to boundary relationships and intersection identifications.

Example 76 provides one or more non-transitory computer-readable storage media according to example 74 or example 75, wherein the objects related to one or more primary objects include one or more of: lane grade (related to a lane); conditional speed limit (related to a lane); and cross traffic lanes (related to an intersection).

Example 77 provides one or more non-transitory computer-readable storage media according to any one of the examples 74-76, wherein the objects with large geometries or no relations to other objects include one or more of: a routable area; a school zone driveable area; and experimental areas for simulation purposes.

Example 78 provides one or more non-transitory computer-readable storage media according to any one of the examples 74-77, wherein the objects with geometries include one or more of: a driveable area; an undriveable area; a rail line; a traffic sign; and a traffic light.

Example 79 provides one or more non-transitory computer-readable storage media according to any one of the examples 74-78, wherein the objects closely related to an object with geometry include one or more of: a buffered crosswalk area (related to a driveable area); and a driveway entry (related to a driveway driveable area).

Example 80 provides one or more non-transitory computer-readable storage media according to any one of the examples 74-79, wherein the relationships between objects in different shards data entries include one or more of: lane connection (related to a start lane); and lane driveable area intersections (related to a lane).

Example 81 provides one or more non-transitory computer-readable storage media according to any one of the examples 73-80, wherein the operations further include generating the shard data entry data based on the data representative of the semantic objects and the set of rules.

Examples of Methods for Storage of Shard Data

Example 82 provides a method for storing shard data. The method may include generating and storing shard data entries. Each shard data entry may include a definition of one or more semantic objects covered by the shard data entry. The method may further include generating and storing shard metadata. The metadata may include references to the shard data entries. The metadata may further include, for each of the shard data entries, data representative of a bounding box indicative of an area in a geographical area that is covered by the shard data entry.

Example 83 provides a method according to example 82, wherein the shard data entries are stored in a database format. The shard metadata may be stored in a database format.

Example 84 provides a method according to example 82 or example 83, wherein the data representative of the bounding box is stored as four floating point values indicative of a minimum x-coordinate, a maximum x-coordinate, a minimum y-coordinate and a maximum y-coordinate, respectively.

Example 85 provides a method according to any one of the examples 82-84, wherein the metadata includes a subtype indicator for each of the shard data entries. The subtype indicator may be indicative of a type of shard.

Example 86 provides a method according to any one of the examples 82-85, wherein the subtype indicator indicates one of the following types: being related to a type of section, wherein the geographical area is split into sections enabling semantic objects to be assigned to a shard; being related to city-wide objects, indicative of the shard including city-wide objects; or being related to experiments for simulation purposes.

Example 87 provides a method according to any one of the examples 82-86, wherein the metadata includes, for each shard data entry, a string value uniquely representing a name of the shard.

Example 88 provides a method according to any one of the examples 82-87, wherein the metadata is used to generate a shard file for each of the shard data entries. Each shard file may include a definition of the semantic objects covered by the shard data entry.

Example 89 provides a method according to any one of the examples 82-88, wherein the metadata is used to generate a shard file for each for the shard data entries. The subtype indicator may be used as a part of a filename of the shard file.

Example 90 provides a method according to any one of the examples 82-90, further including generating and storing a shard metadata file from the shard metadata. The metadata file may include references to the shard files. The metadata file may further include, for each of the shard files, data representative of a bounding box indicative of a location in a geographical area that is covered by each of the shard files.

Example 91 provides a method according to example 90, wherein the shard metadata file is stored in a json file format.

Example 92 provides one or more non-transitory computer-readable storage media including instruction for execution which, when executed by a processor, are operable to perform operations for storing shard data. The operations may include generating shard data entries. Each shard data entry may include a definition of one or more semantic objects covered by the shard data entry. The operations may further include generating shard metadata. The metadata may include references to the shard data entries. The metadata may further include, for each of the shard data entries, data representative of a bounding box indicative of an area in a geographical area that is covered by the shard data entry. The operations may further include outputting the generated shard data entries in a database format for storage in a database storage. The operations may further include outputting the generated shard metadata in a database format for storage in the database storage.

Example 93 provides one or more non-transitory computer-readable storage media according to example 92, wherein the data representative of the bounding box is output as four floating point values indicative of a minimum x-coordinate, a maximum x-coordinate, a minimum y-coordinate and a maximum y-coordinate, respectively.

Example 94 provides one or more non-transitory computer-readable storage media according to example 92 or example 93, wherein the metadata includes a subtype indicator for each of the shard data entries. The subtype indicator may be indicative of a type of shard.

Example 95 provides one or more non-transitory computer-readable storage media according to any one of the examples 92-94, wherein the subtype indicator indicates one of the following types: being related to a type of section, wherein the geographical area is split into sections enabling semantic objects to be assigned to a shard; being related to city-wide objects, indicative of the shard including city-wide objects; or being related to experiments for simulation purposes.

Example 96 provides one or more non-transitory computer-readable storage media according to any one of the examples 92-95, wherein the metadata includes, for each shard data entry, a string value uniquely representing a name of the shard.

Example 97 provides one or more non-transitory computer-readable storage media according to any one of the examples 92-96, wherein the operations further include loading the shard metadata. The operations may further include, for each shard data entry, obtaining the subtype from the loaded shard metadata. The operations may further include generating a shard file for each of the shard data entries. A filename of each of the shard files may include the subtype.

Example 98 provides one or more non-transitory computer-readable storage media according to any one of the examples 92-97, wherein the operations further include generating a shard metadata file from the shard metadata. The metadata file may include references to the shard files. The metadata file may further include, for each of the shard files, data representative of a bounding box indicative of a location in a geographical area that is covered by each of the shard files.

Example 99 provides a shard file including a definition of one or more semantic objects covered by the shard file.

Example 100 provides a shard metadata file including references to shard files and, for each of the shard files, data representative of a bounding box indicative of an area in a geographical area that is covered by the shard file.

Example 101 provides a shard metadata file according to example 100, wherein the data representative of the bounding box is stored as four floating point values indicative of a minimum x-coordinate, a maximum x-coordinate, a minimum y-coordinate and a maximum y-coordinate, respectively.

Other Implementation Notes, Variations, and Applications

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The preceding disclosure presents various descriptions of specific certain embodiments. However, the innovations described herein can be embodied in a multitude of different ways, for example, as defined and covered by the claims and/or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the present disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. If used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further includes machine-readable instructions that when executed cause the system to perform any of the activities discussed above.

What is claimed is:

1. A method for storing shard data, the method comprising:
   utilizing guiding sections defining different parts of a geographical area to identify semantic objects within each guiding section;
   applying one or more map consistency rules to determine whether semantic objects within a given guiding section are to be kept together in a shard;
   generating and storing shard data entries in a shard-to-object relations database, wherein each shard data entry in the shard-to-object relations database identifies a given shard and which semantic objects are part of the given shard; and
   generating and storing shard metadata entries, wherein each shard metadata entry corresponds to a given shard, and includes:
   (1) an integer value as an identifier of the given shard;
   (2) a non-unique string value representing a subtype of the given shard;
   (3) a unique string value representing a name of the given shard constructed from the non-unique string value and a sequence number; and
   (4) four floating point values defining corners of a bounding box covered by the semantic objects of the given shard;
   exporting shard data and storing the shard data as shard files based on the shard metadata entries and the shard-to-object relations database; and
   providing shard files to clients including one or more of an autonomous vehicle, a vehicle, and a computer environment.

2. The method according to claim 1, wherein the shard data entries are stored in a database format, and wherein the shard metadata entries are stored in a database format.

3. The method according to claim 1, wherein the four floating point values are indicative of a minimum x-coordinate, a maximum x-coordinate, a minimum y-coordinate and a maximum y-coordinate, respectively.

4. The method according to claim 1, wherein the subtype indicates the shard being related to a type of the guiding section used in generating the shard.

5. The method according to claim 1, wherein the subtype indicates the shard being related to city-wide objects, indicative of the shard including city-wide objects.

6. The method according to claim 1, wherein the subtype indicates the shard being related to experiments for simulation purposes.

7. The method according to claim 1, wherein the shard metadata entry for the given shard is used to generate the shard file for each of the shard data entries, wherein each shard file comprises a definition of the semantic objects covered by the shard data entry.

8. The method according to claim 1, wherein the shard metadata entry for the given shard is used to generate the shard file for each for the shard data entries, and wherein the subtype is used as a part of a filename of the shard file.

9. The method according to claim 1, further comprising:
generating and storing a shard metadata file from the shard metadata entries, wherein the shard metadata file comprises references to the shard files.

10. The method according to claim 9, wherein the shard metadata file is stored in a json file format.

11. One or more non-transitory computer-readable storage media comprising instruction for execution which, when executed by a processor, are operable to perform operations for storing shard data, the operations comprising:
utilizing guiding sections defining different arts of a geographical area to identify semantic objects within each guiding section;
applying one or more map consistency rules to determine whether semantic objects within a given guiding section are to be kept to ether in a shard;
generating shard data entries in a shard-to-object relations database, wherein each shard data entry in the shard-to-object relations database identifies a given shard and which semantic objects are part of a given shard;
generating shard metadata entries, wherein each shard metadata entry corresponds to a given shard, and includes:
(1) an integer value as an identifier of the given shard;
(2) a non-unique string value representing a subtype of the given shard;
(3) a unique string value representing a name of the given shard constructed from the non-unique string value and a sequence number; and
(4) four floating point values defining corners of a bounding box covered by the semantic objects of the given shard;
exporting shard data and storing the shard data as shard files based on the shard metadata entries and the shard-to-object relations database; and
providing shard files to clients including one or more of an autonomous vehicle a vehicle, and a computer environment.

12. The one or more non-transitory computer-readable storage media according to claim 11, wherein the four floating point values are indicative of a minimum x-coordinate, a maximum x-coordinate, a minimum y-coordinate and a maximum y-coordinate, respectively.

13. The one or more non-transitory computer-readable storage media according to claim 11, wherein the subtype indicates the shard being related to a type of the guiding section used in generating the shard.

14. The one or more non-transitory computer-readable storage media according to claim 11, wherein the subtype indicates the shard being related to city-wide objects, indicative of the shard including city-wide objects.

15. The one or more non-transitory computer-readable storage media according to claim 11, wherein the subtype indicates the shard being related to experiments for simulation purposes.

16. The one or more non-transitory computer-readable storage media according to claim 11, wherein the operations further comprise:
loading the shard metadata entries;
for each shard data entry, obtaining the subtype from the loaded shard metadata entries; and
generating the shard file for each of the shard data entries, wherein a filename of each of the shard files comprises the subtype.

17. The one or more non-transitory computer-readable storage media according to claim 11, wherein the operations further comprise:
generating a shard metadata file from the shard metadata entries, wherein the shard metadata file comprises references to the shard files.

18. A computer system comprising:
one or more processors;
one or more non-transient computer-readable storage devices storing instructions;
one or more database storage devices storing one or more databases;
a database exporter, encoded in the instructions to export shard data from the one or more database storage devices based on:
a shard-to-object relations database stored on the one or more database storage devices, wherein each entry in the shard-to-object relations database identifies a given shard and which semantic objects are part of the given shard; and
shard metadata entries stored on the one or more database storage devices, wherein each metadata entry corresponds to a given shard, and includes:
(1) an integer value as an identifier of the given shard;
(2) a non-unique string value representing a subtype of the given shard;
(3) a unique string value representing a name of the given shard constructed from the non-unique string value and a sequence number; and
(4) four floating point values defining corners of a bounding box covered by the semantic objects of the given shard;
a file storage system to receive shard data exported b the database exporter and to store the shard data as shard files, where one shard file includes data for one shard; and
an u loader encoded in the instructions to upload the shard files to clients including one or more of an autonomous vehicle, a vehicle, and a computer environment.

19. The computer system of claim 18, wherein a filename of the shard file comprises the subtype.

20. The computer system of claim 18, wherein the four floating point values indicative of a minimum x-coordinate, a maximum x-coordinate, a minimum y-coordinate and a maximum y-coordinate, respectively.

* * * * *